(12) United States Patent
Yamada

(10) Patent No.: US 6,779,724 B1
(45) Date of Patent: Aug. 24, 2004

(54) IC CARD READER AND METHOD

(75) Inventor: Mikihiko Yamada, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 30 days.

(21) Appl. No.: 10/069,094

(22) PCT Filed: Aug. 1, 2000

(86) PCT No.: PCT/JP00/05154
§ 371 (c)(1),
(2), (4) Date: Jun. 14, 2002

(87) PCT Pub. No.: WO01/09709
PCT Pub. Date: Feb. 8, 2001

(30) Foreign Application Priority Data

Aug. 2, 1999 (JP) .......................... 11-219118

(51) Int. Cl.$^7$ ................................................ G06K 7/08
(52) U.S. Cl. ........................ 235/451; 235/436; 235/437; 235/438
(58) Field of Search ................................. 235/451, 436, 235/437, 438, 492

(56) References Cited

U.S. PATENT DOCUMENTS

| | | | | |
|---|---|---|---|---|
| 5,640,003 A | * | 6/1997 | Makino | 235/491 |
| 5,790,885 A | * | 8/1998 | Shona | 710/5 |
| 6,027,029 A | * | 2/2000 | Kim | 235/492 |
| 6,271,675 B1 | * | 8/2001 | Sakaki | 324/756 |

FOREIGN PATENT DOCUMENTS

| | | |
|---|---|---|
| JP | 54-108504 | 8/1979 |
| JP | 7-170253 | 7/1995 |
| JP | 8-8995 | 1/1996 |
| JP | 9-179948 | 7/1997 |
| JP | 63-126083 | 5/1998 |

OTHER PUBLICATIONS

Japanese Language Search Report corresponding to appli-cantion No. PCT.JP00/05154 dated Nov. 28, 2000.
English Translation of PCT/ISA/210.

* cited by examiner

*Primary Examiner*—Karl D. Frech
*Assistant Examiner*—Uyen-Chau N. Le
(74) *Attorney, Agent, or Firm*—RatnerPrestia

(57) ABSTRACT

There have been a problem that if the capacity of a receiving buffer is small, data cannot be reliably received and another problem that the rate of detection of transmission errors caused by influence of noise is low. The IC card connector comprises a receiving buffer status flag (305) set up when a receiving buffer (304) cannot hold any more data, an overrun inspecting section (306) for detecting reception of another data while the receiving buffer status flag (305) is set up, and a resending request signal generating section (102) for requesting an IC card to resend the received data if the overrun inspecting section (306) detects overrun. If a receiv-ing buffer (304) receives another data though the receiving buffer (304) cannot hold any more data, the IC card is requested to resend the data, and the same data is received again.

5 Claims, 14 Drawing Sheets

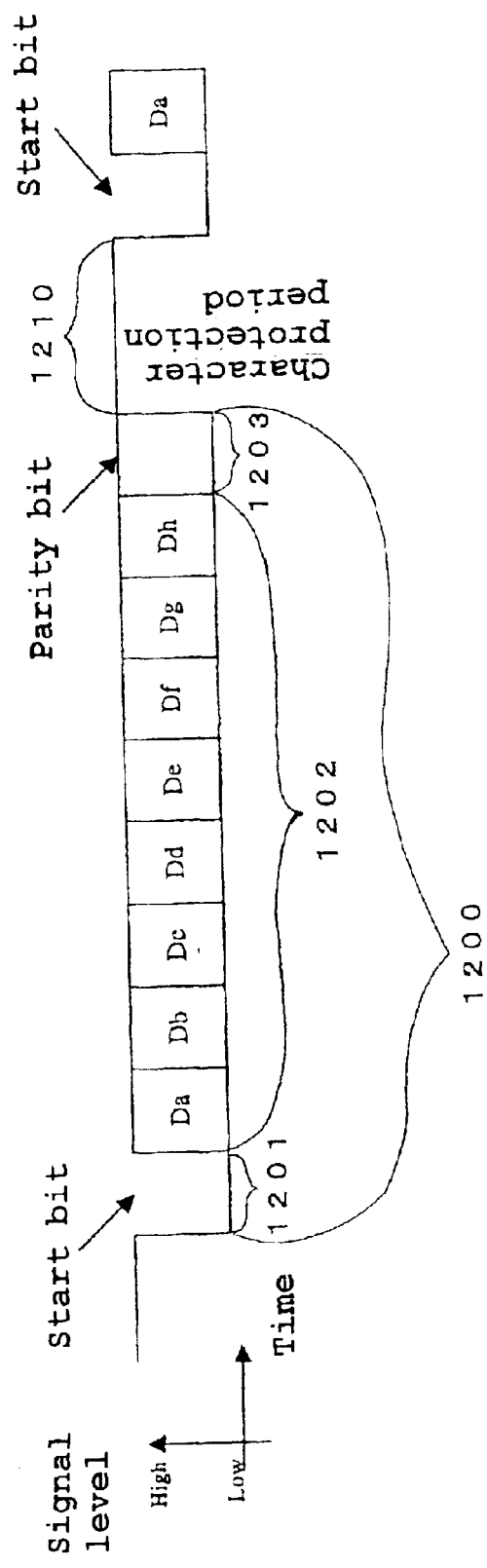
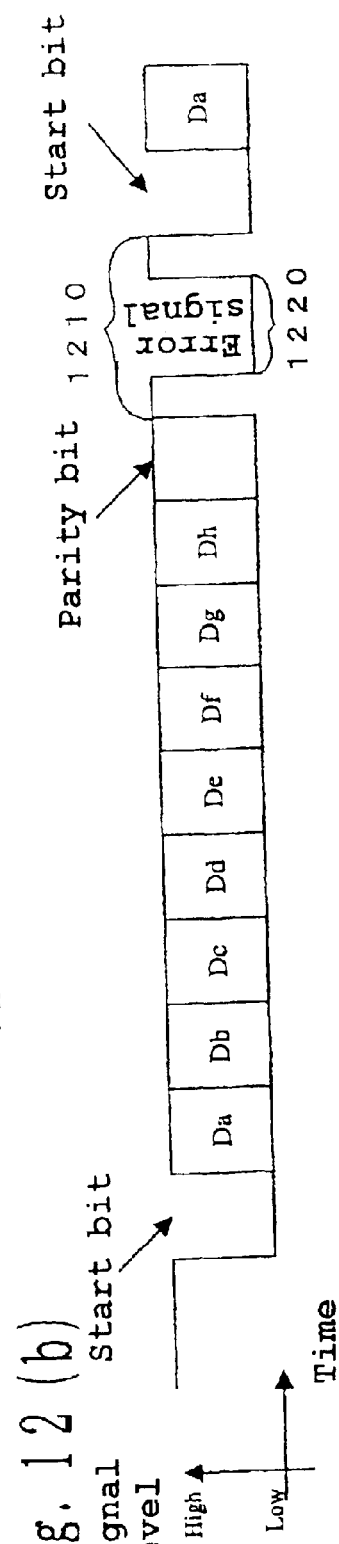
Fig. 12(a)
Fig. 12(b)

US 6,779,724 B1

IC CARD READER AND METHOD

This application is a U.S. national phase application of PCT international application PCT/JP00/05154.

TECHNICAL FIELD

The present invention relates to an IC card reader/writer and method for receiving data transmitted from an IC card.

BACKGROUND ART

FIG. 11 shows a conventional general configuration of a reader/writer for an IC card with an external terminal (hereafter simply referred to as an IC card). IEC/ISO7816 is available as a standard regarding IC cards. In FIG. 11, numeral 1000 designates an IC card reader/writer, numeral 101 designates a CPU, and numeral 109 designates an IC card. Furthermore, in the IC card reader/writer 1000, numeral 201 designates a transmission buffer that temporarily stores transmitted data transmitted from the CPU 101. Numeral 202 designates a parity generation section that calculates the parity of the transmitted data and adds the parity. Numeral 203 designates a parallel/serial conversion section that serially transmits a start bit, transmitted data and a parity bit. Numeral 204 designates a retransmission request signal generation circuit that generates a retransmission request signal and transmits the signal to the IC card 109 when received data has a parity error. Numeral 301 designates a transmission/reception switching section that switches between transmission and reception in communication with the IC card 109. Numeral 302 designates a serial/parallel conversion section that receives the start bit, the data and the parity bit transmitted serially from the IC card 109. Numeral 303 designates a parity check section that checks the parity of the received data and gives a notification to the retransmission request signal generation circuit 204 when there is a parity error. Numeral 304 designates a reception buffer that temporarily stores the received data until the data is read by the CPU 101. Furthermore, numeral 1101 designates a pull-up resistor that switches the signal level of a data terminal (not shown) to High or Low.

Data reception at the conventional IC card reader/writer configured as described above will be described referring to FIG. 11 and FIGS. 12(a) and 12(b). FIGS. 12(a) and 12(b) show the formats of data transmitted from the IC card 109.

During nontransmission, the data terminal of the IC card 109 holds a high impedance state, and its signal level is held High by the pull-up resistor 1101. Data transmission of the IC card 109 is performed by using a character 1200 as one unit having 10 bits in total comprising a start bit 1201 having a Low signal level, data 1202 having 8 bits (Da, Db, Dc, Dd, De, Df, Dg and Dh) and a parity bit 1203. The signal level of the parity bit 1203 is set Low when the calculated number of the high signal levels in the 8-bit data 1202 is even, and is set High when the number is odd. After the parity bit 1201 is transmitted, the data terminal is restored to its high impedance state. The signal level of the data terminal is held High by the pull-up resistor 1101. On the other hand, the IC card reader/writer 1000 on the reception side compares the parity bit value calculated from the 8-bit received data 1202 with the value of the received parity bit 1203. When the value of the parity bit 1203 is correct, the reception side prepares for the reception of the next data. When the value of the parity bit 1203 is not correct, it is judged that a parity error has occurred, and the signal level of the data terminal is set Low as an error signal in the period between 1 etu at the minimum and 2 etu at the maximum after the leading edge ((10.5±0.2) etu) of the start bit 1201. At this time, an error signal 1220 is placed within a character protection period 1210 as shown in FIG. 12(b). The transmission side checks the signal level of the data terminal after (11±0.2) etu from the start bit, and performs the following operation.

(A) When the signal level of the data terminal is High, it is judged that reception is performed properly. (B) When the signal level of the data terminal is Low, in other words, when the error signal 1220 is received, it is judged that transmission is not performed properly, and data retransmission is performed.

It is supposed that the IC card is usually carried and used by a user; however, since the data terminal of the IC card is exposed outside, the terminal is liable to be deteriorated by friction, corrosion, etc. and affected by dirt, moisture, static electricity, etc. Hence, the IC card reader/writer is requested to perform data transmission to and reception from the IC card properly and securely against these external disturbances.

Furthermore, in order that the IC card is widely used, it is necessary to attain functions for carrying out data transmission and reception properly and securely at low cost.

Hence, it is desired that the capacity of the reception buffer, which temporarily stores received data until the data is read by the CPU, is small. However, in the case when the reception buffer receives the next data when it cannot store more data (hereafter this case is referred to as a reception overrun), there is no other choice but to discard the received data or the data having already been stored in the reception buffer, whereby the CPU cannot read the received data properly. When the capacity of the reception buffer is small, this kind of reception overrun is apt to occur. When a reception overrun occurred conventionally at the reception time of the initial response of the IC card, it was necessary to reset the IC card and to receive all data again.

Moreover, FIG. 13 shows the reception sampling timing for the data of one character on both the transmission side and the reception side. When the transmission rate on the transmission side differs from that on the reception side because a clock terminal (not shown in FIG. 11) undergoes the influence of noise or the like, differences occur between the content of 8-bit data 1302 on the side of transmitted data 1300 and the content of 8-bit data 1312 on the side of received data 1310, and the content of the data cannot be received properly in some cases as shown in FIG. 13; this kind of error cannot be detected as a parity error. Conventionally, a function of detecting this kind of transmission error was not available; as a result, the reception side received wrong data from the IC card.

DISCLOSURE OF INVENTION

In consideration of these problems in the transmission and reception of data to and from the conventional IC card, the present invention is intended to provide an IC card reader/writer and method capable of securely receiving data even when the capacity of a reception buffer is small, capable of improving the detection rate of transmission errors occurring because of the influence of noise or the like, and thus capable of attaining more secure data transmission.

One aspect of the present invention is an IC card reader/writer and method comprising:

receiving means that receives data transmitted from an IC card in predetermined processing units, a reception buffer that temporarily stores in predetermined processing units the data received by said receiving means, a reception buffer state flag that is set when said reception buffer results in a state of being unable to store more data, overrun detection means that detects an overrun in the case when said reception buffer state flag has been set and when said receiving means receives new data, and discards said new data having been received, and retransmission request means that requests said IC card to retransmit data having the same content as that of said discarded data when at least said overrun is detected.

Accordingly, data transmitted from the IC card can be received securely,

Another aspect of the present invention is the IC card reader/writer, further comprising:

a PTS flag that is set only when said IC card can retransmit data in character units, wherein said retransmission request means requests said IC card to retransmit said received data when said overrun has been detected and said PTS flag has been set.

Accordingly, data transmitted from the IC card that can retransmit data in character units can be received securely.

Still another aspect of the present invention is the IC card reader/writer, further comprising an overrun detection flag that is set when said overrun detection means detects said overrun.

Accordingly, data transmitted from the IC card can be received securely.

Yet still another aspect of the present invention is the IC card reader/writer, further comprising:

an overrun detection counter that counts the number of said overruns detected by said overrun detection means, a retransmission request number register that determines the maximum of the number of said overruns, and comparing means that compares the number of said detected overruns with the number determined in said retransmission request number register, wherein when the number of said detected overruns has reached said determined number as the result of the comparison by said comparing means, said retransmission request means does not request retransmission of data having the same content as that of said discarded data.

Accordingly, the function of securely receiving data transmitted from the IC card does not go into an infinite loop.

Still yet another aspect of the present invention is the IC card reader/writer, further comprising a retransmission request state register that notifies that the number of said detected overruns has reached the number determined in said retransmission request number register.

Accordingly, the function of securely receiving data transmitted from the IC card does not go into an infinite loop.

A further aspect of the present invention is an IC card reader/writer comprising:

receiving means that receives a signal transmitted from an IC card and including data in predetermined processing units to be transmitted with a protection period held therebetween, signal level checking means that, in the case when said receiving means receives said data in said predetermined processing units, checks the level of said signal in a predetermined period after a predetermined reception period for receiving said data, and retransmission request means that discards said data in said predetermined processing units and requests said IC card to retransmit data having the same content as that of said discarded data when said signal level checking means detects a predetermined level at least in the whole or parts of said signal in said predetermined period.

Accordingly, data transmitted from the IC card can be received securely.

A still further aspect of the present invention is the IC card reader/writer, wherein said signal level checking means detects the level of said signal of the minimum unit in said predetermined period immediately after said reception period.

Accordingly, data transmitted from the IC card can be received securely.

A yet further aspect of the present invention is the IC card reader/writer, further comprising:

a PTS flag that is set only when said IC card can retransmit said data in character units, wherein said retransmission request means requests said IC card to retransmit said received data when said signal level checking means has detected said predetermined signal level in said predetermined period and said PTS flag has been set.

Accordingly, data transmitted from the IC card that can retransmit data in character units can be received securely.

A still yet further aspect present invention is the IC card reader/writer, further comprising a frame violation flag that is set when said signal level checking means detects said predetermined signal level in said predetermined period.

Accordingly, data transmitted from the IC card can be received securely.

An additional aspect of the present invention is the IC card reader/writer, further comprising:

a frame violation detection counter that counts the number of times said predetermined signal is detected in said predetermined period by said signal level checking means, a retransmission request number register that determines the maximum of the number of times said predetermined signal is detected, and comparing means that compares the number of times counted by said frame violation detection counter with the value of said retransmission request number register, wherein when the number of times said predetermined signal is detected in said predetermined period has reached a predetermined number of said retransmission request number register as the result of the comparison by said comparing means, said retransmission request means does not request retransmission of data having the same character as that of said received data.

Accordingly, the function of securely receiving data transmitted from the IC card does not go into an infinite loop.

A still additional aspect of the present invention is the IC card reader/writer, further comprising a retransmission request state register that notifies that the number of times said predetermined signal level is detected in said predetermined period has reached the number determined in said retransmission request number register.

Accordingly, the function of securely receiving data transmitted from the IC card does not go into an infinite loop.

The above-mentioned IC card reader/writer of the present invention has a function of performing a check as to whether the reception buffer can store data or not, and makes a retransmission request to the IC card in the case when new data is received when the reception buffer cannot store more data. Hence, the IC card retransmits the same data; in this period, the CPU reads data from the reception buffer, whereby data can be stored in the reception buffer. As described above, the present invention is characterized in that proper data is received securely while preventing reception overruns. The present invention can provide an inexpensive IC card reader/writer, since data can be received securely even when the capacity of the reception buffer is made small.

Furthermore, when a Low signal level is detected in a period following a parity bit, wherein the signal level must be High (hereafter this case is referred to as a frame error), a retransmission request is made to the IC card, whereby it is characterized that proper data is received securely in a way similar to that described above. In the present invention, the detection rate of transmission errors occurring because of temporary differences between the data transmission rate on the reception side arid that on the transmission side due to the influence of noise or the like is improved, whereby it is possible to realize more secure data transmission.

BRIEF DESCRIPTION OF DRAWINGS

FIGS. 12(a) and 12(b) show the transmission data formats of the IC card;

EXPLANATION OF REFERENCE NUMERALS

Figure 1:
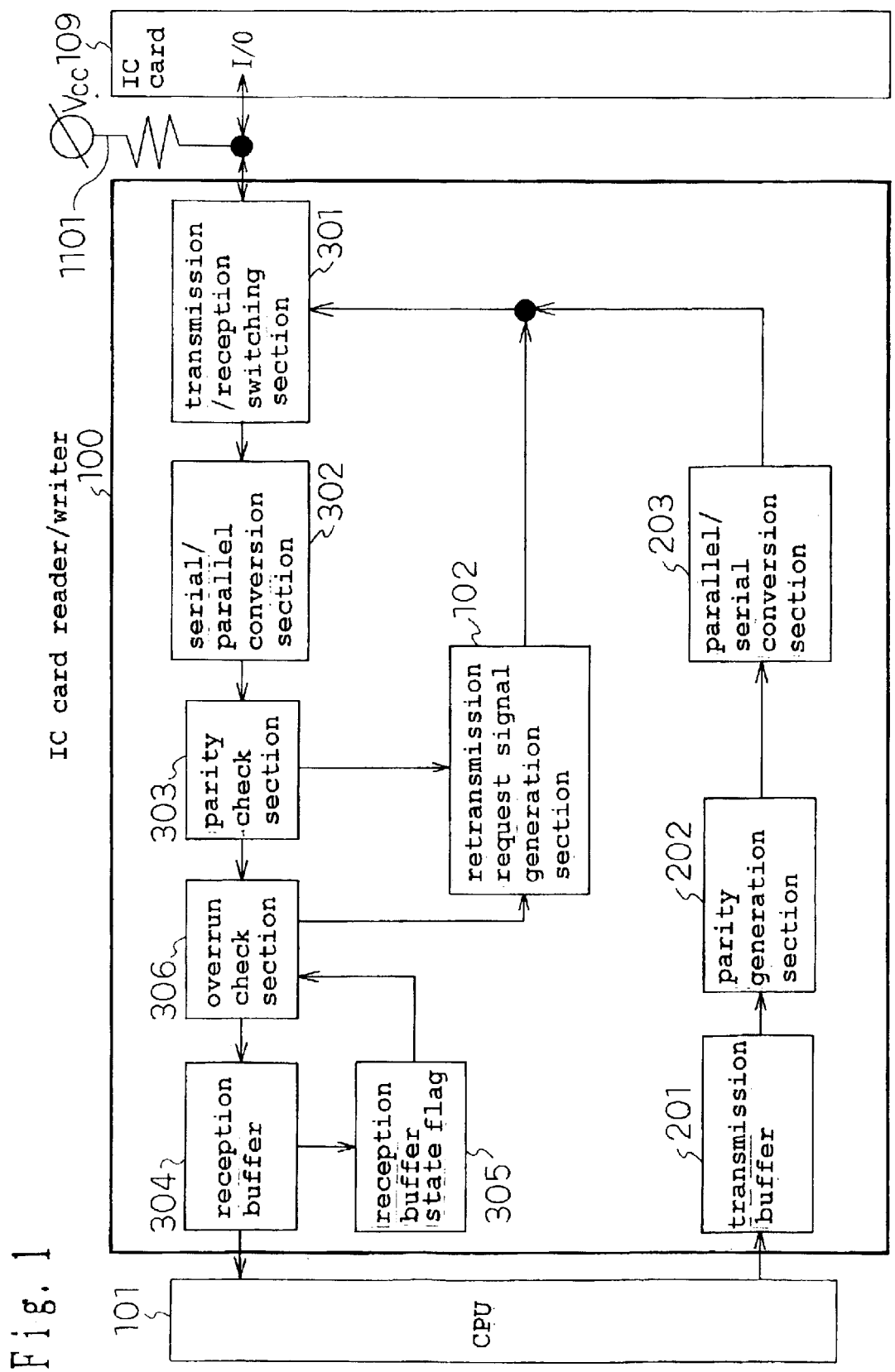
FIG. 1 is a system diagram of an IC card reader/writer in accordance with Reference Example 1 of the present invention.

100, 110, 120, 130, 140, 150, 160, 170, 180, 190, 1000 IC card reader/writer
101 CPU
102, 103, 104, 105, 106, 107 retransmission request signal generation section
109 IC card
201 transmission buffer
202 parity generation section
203 parallel/serial conversion section
204 retransmission request signal generation circuit
301 transmission/reception switching section
302 serial/parallel conversion section
303 parity check section
304 reception buffer
305 reception buffer state flag
306 overrun check section
307 PTS flag
308 overrun detection flag
309 overrun detection counter
310 retry number register
311 comparison section
312 retry state register
401 frame check section
402 frame violation flag
403 frame violation detection counter
1101 pull-up resistor
1200 character
1201 1301, 1311, 1401, 1411 start bit
1202 1302, 1312, 1402, 1412 8-bit data
1203, 1303, 1313, 1403, 1413 parity bit
1210, 1404, 1420 character protection period
1220 error signal
1300, 1400 transmitted data
1310, 1410 received data

BEST MODE FOR CARRYING OUT THE INVENTION

The present invention will be described below on the basis of drawings showing the embodiments thereof.

REFERENCE EXAMPLE 1

FIG. 1 is a system diagram of an IC card reader/writer in accordance with Reference Example 1 of the related art of the present invention. The IC card reader/writer in accordance with this reference example has a function and method of discarding new data in the case when the new data is received when a reception buffer for temporarily storing data transmitted from an IC card cannot store more received data, making a retransmission request for the IC card and receiving the same data again.

In FIG. 1, numeral 100 designates an IC card reader/writer, numeral 101 designates a CPU, and numeral 109 designates an IC card. Furthermore, in the IC card reader/writer 100, numeral 201 designates a transmission buffer that temporarily stores transmitted data. Numeral 202 designates a parity generation section that generates a parity bit from the transmitted data. Numeral 203 designates a parallel/serial conversion section that serially transmits a start bit, 8-bit transmitted data and a parity bit. Numeral 102 designates a retransmission request signal generation section that issues a retransmission request signal to the IC card 109 and is used as a retransmission request means of the related art of the present invention. Numeral 301 designates a transmission/reception switching section that switches between data transmission to the IC card and data reception from the IC card 109. Numeral 302 designates a serial/ parallel conversion section that receives data transmitted serially from the IC card 109 and is used as a receiving means of the present invention. Numeral 303 designates a parity check section that compares the received parity bit with the parity calculated from the received data. Numeral 304 designates a reception buffer that temporarily stores the received data in character units. Numeral 305 designates a reception buffer state flag indicating that when the capacity of the reception buffer 304 is fully used, the buffer cannot store more received data. Numeral 306 designates an overrun check section that detects that new data is received when the reception buffer state flag 305 has been set (reception overrun) and is used as an overrun detection means of the related art of the present invention. Furthermore, numeral 1101 designates a pull-up resistor that switches the signal level of a data terminal (not shown) to High or Low.

The operation of the IC card reader/writer in accordance with Reference Example 1 of the related art of the present invention configured as described above will be described referring to the drawings.

First, data transmitted serially from the IC card 109 has a character unit as shown in FIG. 12, one character 1200 comprises first the start bit 1201, next the 8-bit data 1202 and the parity bit 1203, and the data is received by the serial/parallel conversion section 302. Next, the parity check section 303 performs a check as to whether the parity calculated from the 8-bit received data 1202 coincides with the received parity bit 1203. When there is no coincidence between the two parity values, a notification is given to the retransmission request signal generation section 102, and the retransmission request signal generation section 102 transmits a retransmission request signal to the IC card 109.

When there is a coincidence between the parity values, the received data is transmitted to the overrun check section 306. The overrun check section 306 checks the reception buffer state flag 305, and stores the received data in the reception buffer 304 when the reception buffer state flag 305 has not been set. When the capacity of the reception buffer 304 is fully used because of the storage of the received data at this time, the reception buffer state flag 305 is set.

On the other hand, when the reception buffer state flag 305 has been set, the overrun check section 306 discards the received data, and performs input for generating a retransmission request signal to the retransmission request signal generation section 102. After receiving the input from the overrun check section 306, on the basis of this, the retransmission request signal generation section 102 outputs to the IC card 109 a retransmission request signal for transmitting data having the same character as that of the discarded received data from the IC card 109. After receiving the retransmission request signal, the IC card 109 retransmits data having the same character as that of the data transmitted the last time.

While the IC card 109 retransmits the data, the reception buffer 304 outputs the temporarily stored data to the CPU 101. Therefore, the reception buffer 304 can have a vacant capacity, whereby the reception buffer state flag 305 is reset.

Hence, after the data retransmitted by the IC card 109 was received by the IC card reader/writer, and the parity check section 303 confirmed that the parity values were coincident, the overrun check section 306 checked that the reception buffer state flag 305 was not set, whereby the retransmitted data is stored in the reception buffer 304.

In the IC card reader/writer 100 in accordance with this Reference Example, after the overrun check section 306 checks the reception buffer state flag 305 and confirms that the reception buffer 304 is full, the data received once is retransmitted from the IC card 109 in character units by using the retransmission request signal generation section 102 as described above, whereby it is not necessary to reset the IC card and to retransmit all data even when a reception overrun occurs, and only the necessary data can be retransmitted.

REFERENCE EXAMPLE 2

Figure 2:
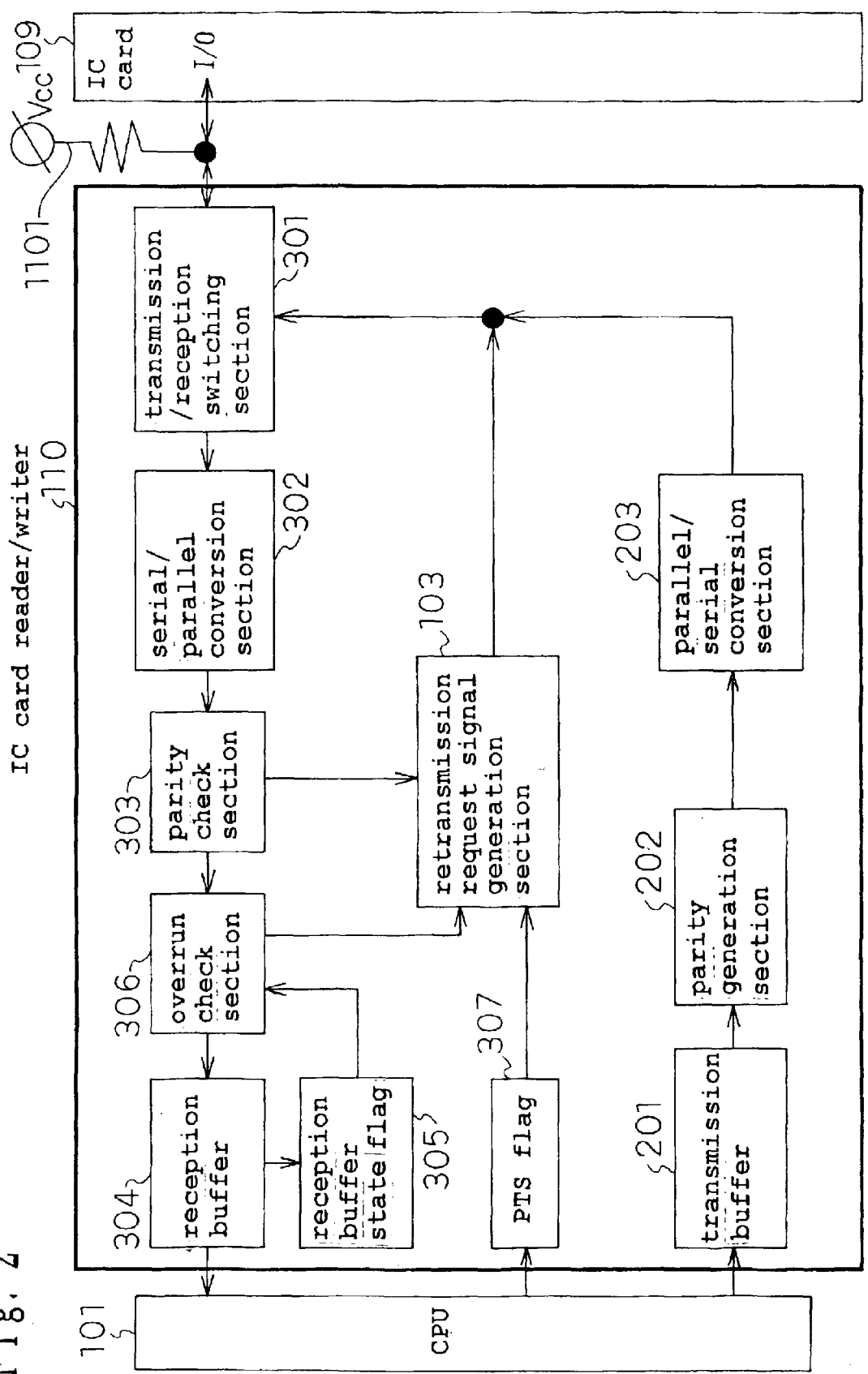
FIG. 2 is a system diagram of an IC card reader/writer in accordance with Reference Example 2 of the present invention.

FIG. 2 is a system diagram of an IC card reader/writer in accordance with Reference Example 2 of the related art of the present invention. The IC card reader/writer in accordance with this Reference Example has a function of transmitting a request signal to an IC card when a reception buffer for temporarily storing data transmitted from the IC card cannot store more received data and only when a transmission protocol is T=0.

In FIG. 2, numeral 110 designates an IC card reader/writer, numeral 101 designates a CPU, and numeral 109 designates an IC card. Furthermore, in the IC card reader/writer 110, numeral 201 designates a transmission buffer that temporarily stores transmitted data. Numeral 202 designates a parity generation section that generates a parity bit from the transmitted data. Numeral 203 designates a parallel/serial conversion section that serially transmits a start bit, 8-bit transmitted data and a parity bit. Numeral 103 designates a retransmission request signal generation section that issues a retransmission request signal to the IC card 109 and is used as a retransmission request means of the related art of the present invention. Numeral 301 designates a transmission/reception switching section that switches between data transmission to the IC card 109 and data reception from the IC card 109. Numeral 302 designates a serial/parallel conversion section that receives data transmitted serially from the IC card 109. Numeral 303 designates a parity check section that compares the received parity bit with the parity calculated from the received data. Numeral 304 designates a reception buffer that temporarily stores the received data in character units. Numeral 305 designates a reception buffer state flag indicating that when the capacity of the reception buffer 304 is fully used, the buffer cannot store more received data. Numeral 306 designates an overrun check-section that detects a reception overrun on the basis of the reception buffer state flag 305 and is used as an overrun detection means of the related art of the present invention. Numeral 307 designates a PTS flag indicating a transmission protocol for the IC card 109. Furthermore, numeral 1101 designates a pull-up resistor that switches the signal level of a data terminal (not shown) to High or Low.

The operation of the IC card reader/writer in accordance with this Reference Example configured as described above will be described referring to the drawings. However, the details of components overlapping with those of Reference Example 1 are omitted, and only the differences therebetween will be described.

First, before data reception, the CPU 101 identifies the transmission protocol for the IC card 304 cannot store more received data.

As described above, in this Reference Example, the retransmission request signal generation section 103 performs retransmission referring to the PTS flag 307, whereby this embodiment is applicable to the IC card conforming to the IEC/ISO7816 Standard.

REFERENCE EXAMPLE 3

Figure 3:
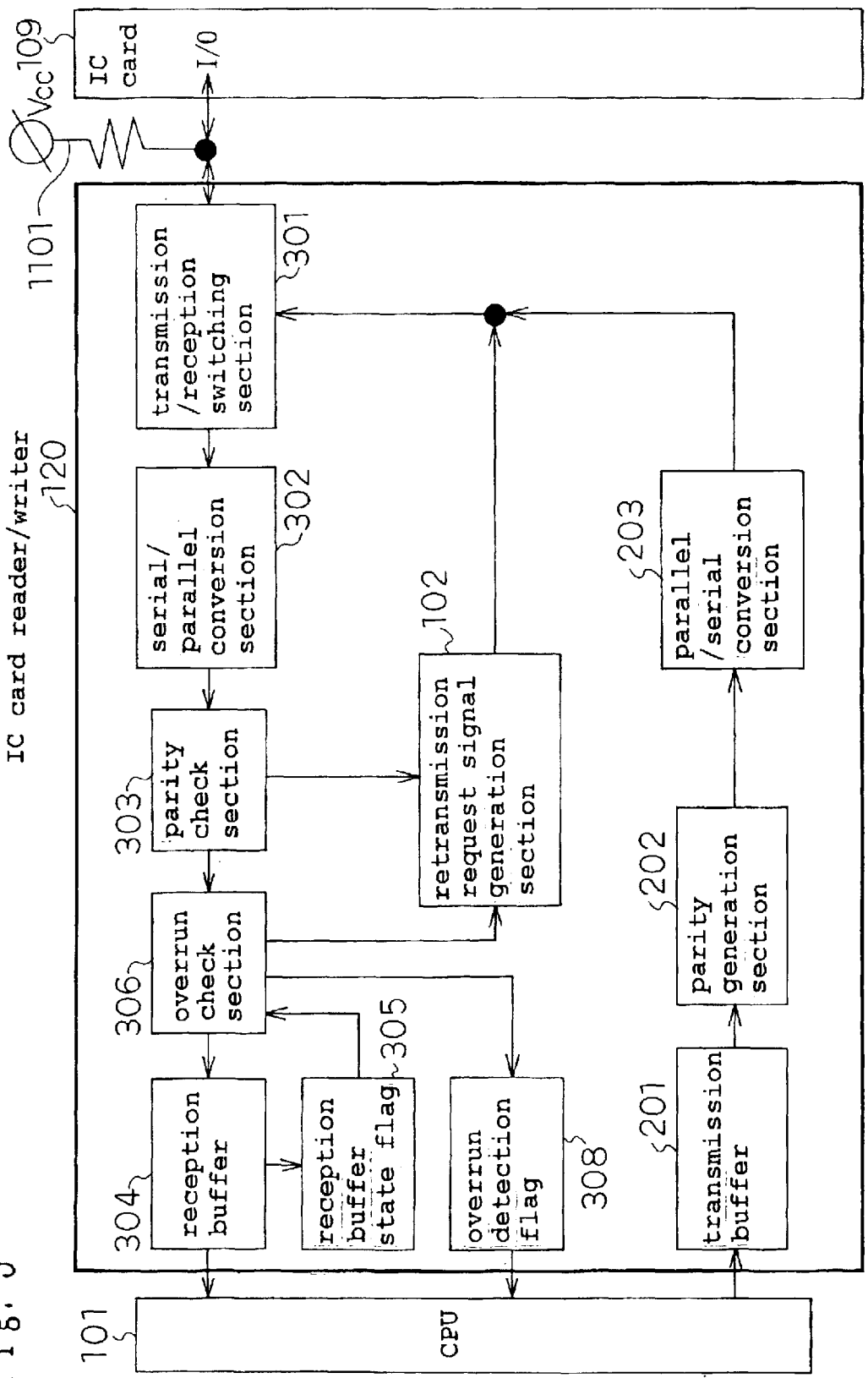
FIG. 3 is a system diagram of an IC card reader/writer in accordance with Reference Example 3 of the present invention.

FIG. 3 is a system diagram of an IC card reader/writer in accordance with Reference Example 3 of the related art of the present invention. The IC card reader/writer in accordance with this embodiment has a function of discarding new data in the case when the new data is received when a reception buffer for temporarily storing data transmitted from the IC card 109 cannot store more received data, transmitting a retransmission request signal to the IC card 109 and giving a notification about overrun detection to the outside.

In FIG. 3, numeral 120 designates an IC card reader/writer, numeral 101 designates a CPU, and numeral 109 designates an IC card. Furthermore, in the IC card reader/writer 120, numeral 201 designates a transmission buffer that temporarily stores transmitted data. Numeral 202 designates a parity generation section that generates a parity bit from the transmitted data. Numeral 203 designates a parallel/serial conversion section that serially transmits a start bit, 8-bit transmitted data and a parity bit. Numeral 102 designates a retransmission request signal generation section that issues a retransmission request signal to the IC card 109 and is used as a retransmission request means of the related art of the present invention. Numeral 301 designates a transmission/reception switching section that switches between data transmission to the IC card 109 and data reception from the IC card 109. Numeral 302 designates a serial/parallel conversion section that receives data transmitted serially from the IC card 109 and is used as a receiving means of the related art of the present invention. Numeral 303 designates a parity check section that compares the received parity bit with the parity calculated from the received data. Numeral 304 designates a reception buffer that temporarily stores the received data in character units. Numeral 305 designates a reception buffer state flag indicating that when the capacity of the reception buffer is fully used, the buffer cannot store more received data. Numeral 306 designates an overrun check section that detects a reception overrun on the basis of the reception buffer state flag 305. Numeral 308 designates an overrun detection flag that is set when a reception overrun is detected. Furthermore, numeral 1101 designates a pull-up resistor that switches the signal level of a data terminal (not shown) to High or Low.

The operation of the IC card reader/writer in accordance with this Reference Example configured as described above will be described referring to the drawings. However, the details of components overlapping with those of Reference Example 1 are omitted, and only the differences therebetween will be described.

First, data transmitted from the IC card 109 is received by the serial/parallel conversion section 302. Then, the parity check section 303 performs a check as to whether the parity calculated from the 8-bit received data coincides with the received parity. When there is no coincidence between the parity values, a notification is given to the retransmission request signal generation section 102, and a retransmission request signal is transmitted to the IC card 109. Furthermore, when there is a coincidence between the parity values, the received data is transmitted to the overrun check section 306. The overrun check section 306 checks the reception buffer state flag 305, discards the received data when the reception buffer state flag 305 has been set, and allows the retransmission request signal generation section 102 to transmit a retransmission request signal to the IC card 109. The reception buffer state flag 305 is set only when the reception buffer 304 cannot store more received data.

The above-mentioned operation is similar to the operation in Reference Example 1; however, in this Reference Example, the overrun detection flag 308 is set when the overrun check section 306 detects a reception overrun. The state of the overrun detection flag 308 is checked by the CPU 101, whereby the CPU 101 can recognize that an overrun has occurred during data reception from the IC card.

REFERENCE EXAMPLE 4

Figure 4:
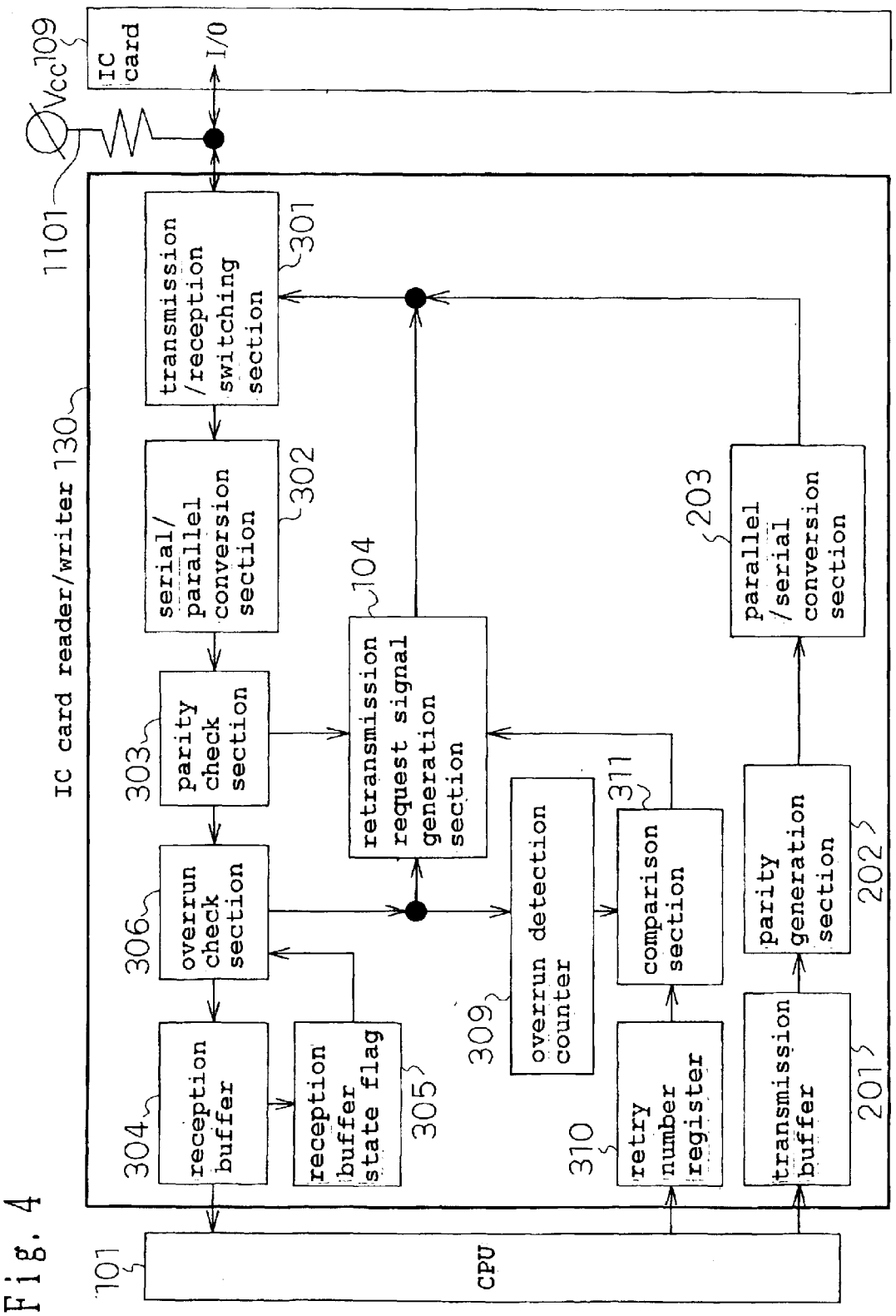
FIG. 4 is a system diagram of an IC card reader/writer in accordance with Reference Example 4 of the present invention.

FIG. 4 is a system diagram of an IC card reader/writer in accordance with Reference Example 4 of the prior art of the present invention. The IC card reader/writer in accordance with this Reference Example has a function of transmitting a retransmission request signal to the IC card 109 in the case when new data is received when a reception buffer for temporarily storing data transmitted from the IC card 109 cannot store more received data, and not transmitting a retransmission request signal in the case when the number of continuous retransmission requests has reached a predetermined value in the reception of the same data.

In FIG. 4, numeral 130 designates an IC card reader/writer, numeral 101 designates a CPU, and numeral 109 designates an IC card. Furthermore, in the IC card reader/writer 130, numeral 202 designates a parity generation section that generates a parity bit from the transmitted data. Numeral 203 designates a parallel/serial conversion section that serially transmits a start bit, 8-bit transmitted data and a parity bit. Numeral 104 designates a retransmission request signal generation section that issues a retransmission request signal to the IC card 109 and is used as a retransmission request means of the related art of the present invention. Numeral 301 designates a transmission/reception switching section that switches between data transmission to the IC card 109 and data reception from the IC card 109. Numeral 302 designates a serial/parallel conversion section that receives data transmitted serially from the IC card 109. Numeral 303 designates a parity check section that compares the received parity bit with the parity calculated from the received data. Numeral 304 designates a reception buffer that temporarily stores the received data in character units. Numeral 305 designates a reception buffer state flag indicating that when the capacity of the reception buffer 304 is fully used, the buffer cannot store more received data. Numeral 306 designates an overrun check section that detects a reception overrun on the basis of the reception buffer state flag 305, and is used as an overrun detection means of the related art of the present invention. Numeral 309 designates an overrun detection counter that counts the number of continuous retransmission requests in the reception of the same data. Numeral 310 designates a retry number register that determines the upper limit of the number of continuous retransmission requests in the reception of the same data and is used as a retransmission request number of the related art of the present invention. Numeral 311 designates a comparison section for comparing the value of the overrun detection counter 309 with the value of the retry number register 310. Furthermore, numeral 1101 designates a pull-up resistor that switches the signal level of a data terminal (not shown) to High or Low.

The operation of the IC card reader/writer configured as described above will be described referring to the drawings. However, the details of components overlapping with those of Reference Example 1 are omitted, and only the differences therebetween will be described.

First, the CPU 101 sets in the retry number register 310 the upper limit of the number of continuous retransmission requests in the reception of the same data transmitted from the IC card 109.

Next, data transmitted from the IC card 109 is received by the serial/parallel conversion section 302. Then, the parity check section 303 performs a check as to whether the parity calculated from the 8-bit received data coincides with the received parity. When there is no coincidence between the parity values, a notification is given to the retransmission request signal generation section 104, and a retransmission request signal is transmitted to the IC card 109. When there is a coincidence between the parity values, the received data is transmitted to the overrun check section 306. The overrun check section 306 checks the reception buffer state flag 305, discards the received data when the reception buffer state flag 305 has been set, and allows the retransmission request signal generation section 104 to transmit a retransmission request signal to the IC card 109. The reception buffer state flag 305 is set only when the reception buffer 304 cannot store more received data.

The above-mentioned operation is similar to the operation in Reference Example 1; however, in this Reference Example, when the overrun check section 306 detects a reception overrun in one data reception operation, 1 is added to the value of the overrun detection counter 309; when the overrun check section 306 does not detect a reception overrun, the value of the overrun detection counter 309 is reset.

The comparison section 311 compares the value of the overrun detection counter 309 with the value of the retry number register 310; when the value of the overrun detection counter 309 has reached the value of the retry number register 310, a notification is given to retransmission request signal generation section 104 so as not to request retransmission even if the overrun check section 306 detects a reception overrun.

REFERENCE EXAMPLE 5

Figure 5:
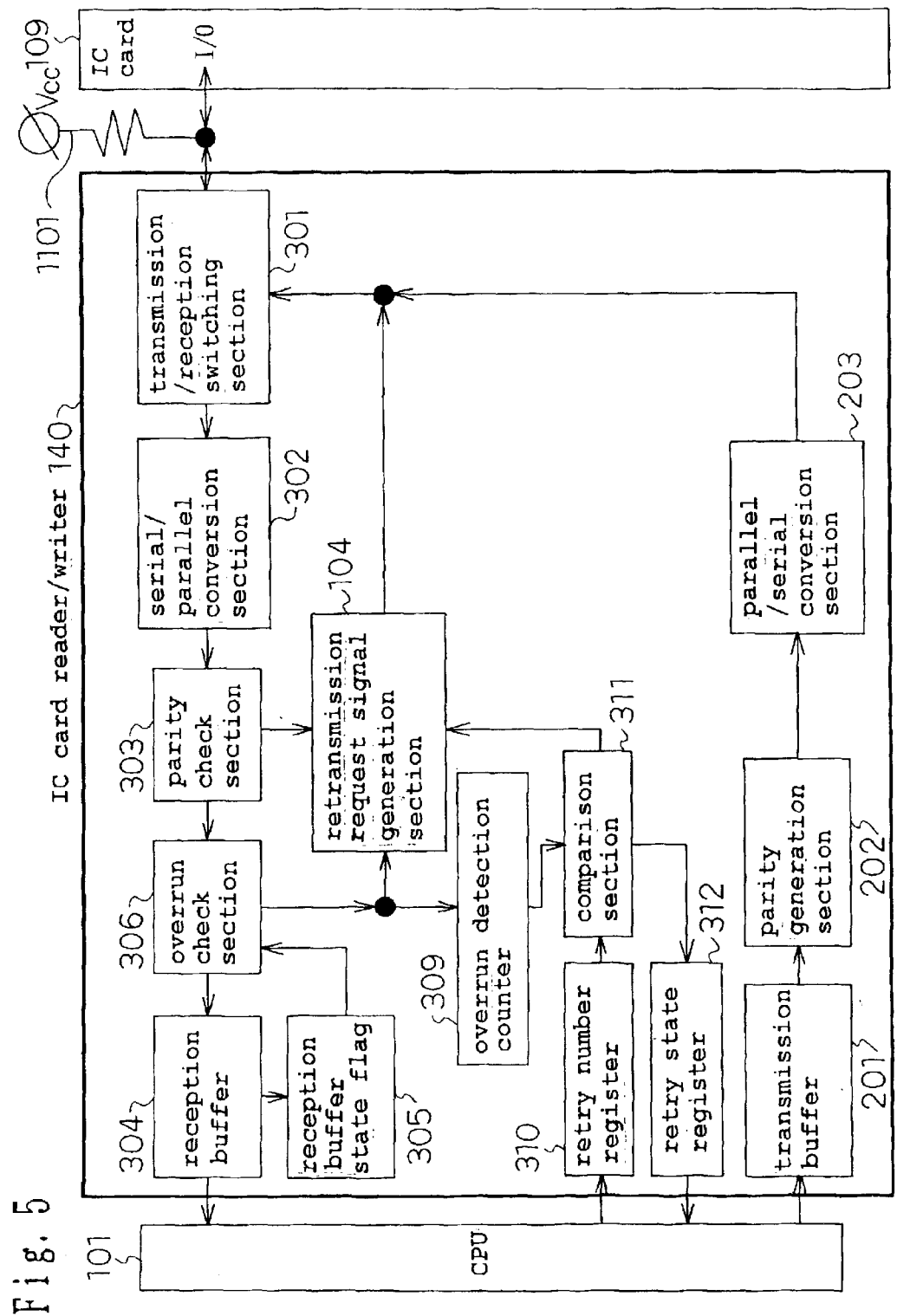
FIG. 5 is a system diagram of an IC card reader/writer in accordance with Reference Example 5 of the present invention.

FIG. 5 is a system diagram of an IC card reader/writer in accordance with Reference Example 5 of the present invention. The IC card reader/writer in accordance with this Reference Example has a function of transmitting a retransmission request signal to the IC card 109 in the case when a reception buffer for temporarily storing data transmitted from the IC card 109 cannot store more received data, not transmitting a retransmission request signal in the case when the number of continuous retransmission requests has reached a predetermined value in the reception of the same data, and giving a notification that the number of continuous retransmission requests in the reception of the same data has reached the predetermined value.

In FIG. 5, numeral 140 designates an IC card reader/writer, numeral 101 designates a CPU, and numeral 109 designates an IC card. Furthermore, in the IC card reader/writer 140, numeral 202 designates a parity generation section that generates a parity bit from the transmitted data. Numeral 203 designates a parallel/serial conversion section that serially transmits a start bit, 8-bit transmitted data and a parity bit. Numeral 104 designates a retransmission request signal generation section that issues a retransmission request signal to the IC card 109 and is used as a retransmission request means of the related art of the present invention. Numeral 301 designates a transmission/reception switching section that switches between data transmission to the IC card 109 and data reception from the IC card 109. Numeral 302 designates a serial/parallel conversion section that receives data transmitted serially from the IC card 109 and is used as a receiving means of the related art of the present invention. Numeral 303 designates a parity check section that compares the received parity bit with the parity calculated from the received data. Numeral 304 designates a reception buffer that temporarily stores the received data in character units. Numeral 305 designates a reception buffer state flag indicating that when the capacity of the reception buffer 304 is fully used, the buffer cannot store more received data. Numeral 306 designates an overrun check section that detects a reception overrun. Numeral 309 designates an overrun detection counter that counts the number of continuous retransmission requests in the reception of the same data. Numeral 310 designates a retry number register that determines the upper limit of the number of continuous retransmission requests in the reception of the same data. Numeral 311 designates a comparison section for comparing the value of the overrun detection counter 309 with the value of the retry number register 310. Numeral 312 designates a retry state register that indicates that the number of continuous retransmission requests in the reception of the same data has reached the value having been set in the retry number register 310 and is used as a retransmission request state register of the related art of the present invention. Furthermore, numeral 1101 designates a pull-up resistor that switches the signal level of a data terminal (not shown) to High or Low.

The operation of the IC card reader/writer in accordance with this Reference Example configured as described above will be described referring to the drawings. However, the details of components overlapping with those of Reference Example 1 or 4 are omitted, and only the differences therebetween will be described.

First, the CPU 101 sets in the retry number register 310 the upper limit of the number of continuous retransmission requests in the reception of the same data transmitted from the IC card 109.

Next, data transmitted from the IC card 109 is received by the serial/parallel conversion section 302. Then, the parity check section 303 performs a check as to whether the parity calculated from the 8-bit received data coincides with the received parity. When there is no coincidence between the parity values, a notification is given to the retransmission request signal generation section 104, and a retransmission request signal is transmitted to the IC card 109. When there is a coincidence between the parity values, the received data is transmitted to the overrun check section 306. The overrun check section 306 checks the reception buffer state flag 305, discards the received data when the reception buffer state flag 305 has been set, and the retransmission request signal generation section 104 transmits a retransmission request signal to the IC card 109. The reception buffer state flag 305 is set only when the reception buffer 304 cannot store more received data. The overrun detection counter 309 is reset when no reception overrun is detected by the overrun check section 306 at the time of data reception; when a reception overrun is detected, 1 is added to the value of the counter. The comparison section 311 compares the value of the overrun detection counter 309 with the value of the retry number register 310; when the value of the overrun detection counter 309 has reached the value of the retry number register 310, a notification is given to the retransmission request signal generation section 104 so as not to request retransmission even if a reception overrun is detected.

The above-mentioned operation is similar to the operation in Reference Example 4; however, in this Reference Example, when the value of the overrun detection counter 309 has reached the value of the retry number register 310 in one data reception operation in accordance with the comparison by the comparison section 11, the retry state register 312 is set. Hence, the CPU 101 can recognize the number of retransmission requests on the basis of a reception overrun during data reception from the IC card.

EMBODIMENT 1

Figure 6:
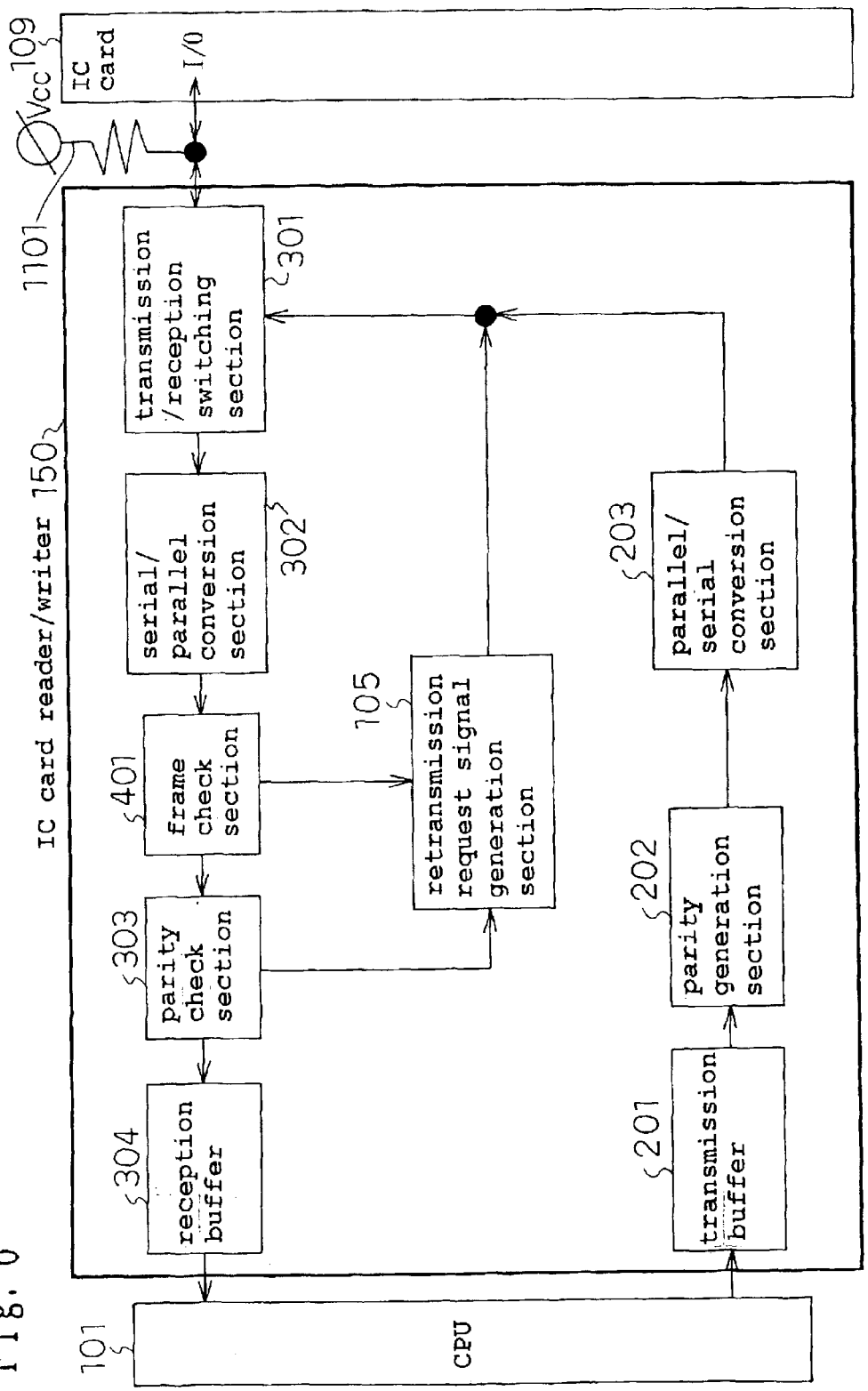
FIG. 6 is a system diagram of an IC card reader/writer in accordance with Embodiment 1 of the present invention.

FIG. 6 is a system diagram of an IC card reader/writer in accordance with Embodiment 1 of the present invention. The IC card reader/writer in accordance with this embodiment has a function of making a retransmission request to the IC card 109 when receiving data transmitted from the IC card 109 and when a Low signal level is detected while the character of the received data is protected, and receiving the same data again.

In FIG. 6, numeral 150 designates an IC card reader/writer, numeral 101 designates a CPU, and numeral 109 designates an IC card. Furthermore, in the IC card reader/writer 150, numeral 201 designates a transmission buffer that temporarily stores transmitted data. Numeral 202 designates a parity generation section that generates a parity Pit from the transmitted data. Numeral 203 designates a parallel/serial conversion section that serially transmits a start bit, 8-bit transmitted data and a parity bit. Numeral 105 designates a retransmission request signal generation section that issues a retransmission request signal to the IC card 109 and is used as a retransmission request means of the present invention.

Numeral 301 designates a transmission/reception switching section that switches between data transmission to the IC card 109 and data reception from the IC card 109. Numeral 302 designates a serial/parallel conversion section that receives data transmitted serially from the IC card 109 and is used as a receiving means of the present invention. Numeral 401 designates a frame check section that checks the signal level in the character protection period and is used as a signal level checking means of the present invention. Numeral 303 designates a parity check section that compares the received parity bit with the parity calculated from the received data. Numeral 304 designates a reception buffer that temporarily stores the received data. Furthermore, numeral 1101 designates a pull-up resistor that switches the signal level of a data terminal (not shown) to High or Low.

Figure 14:
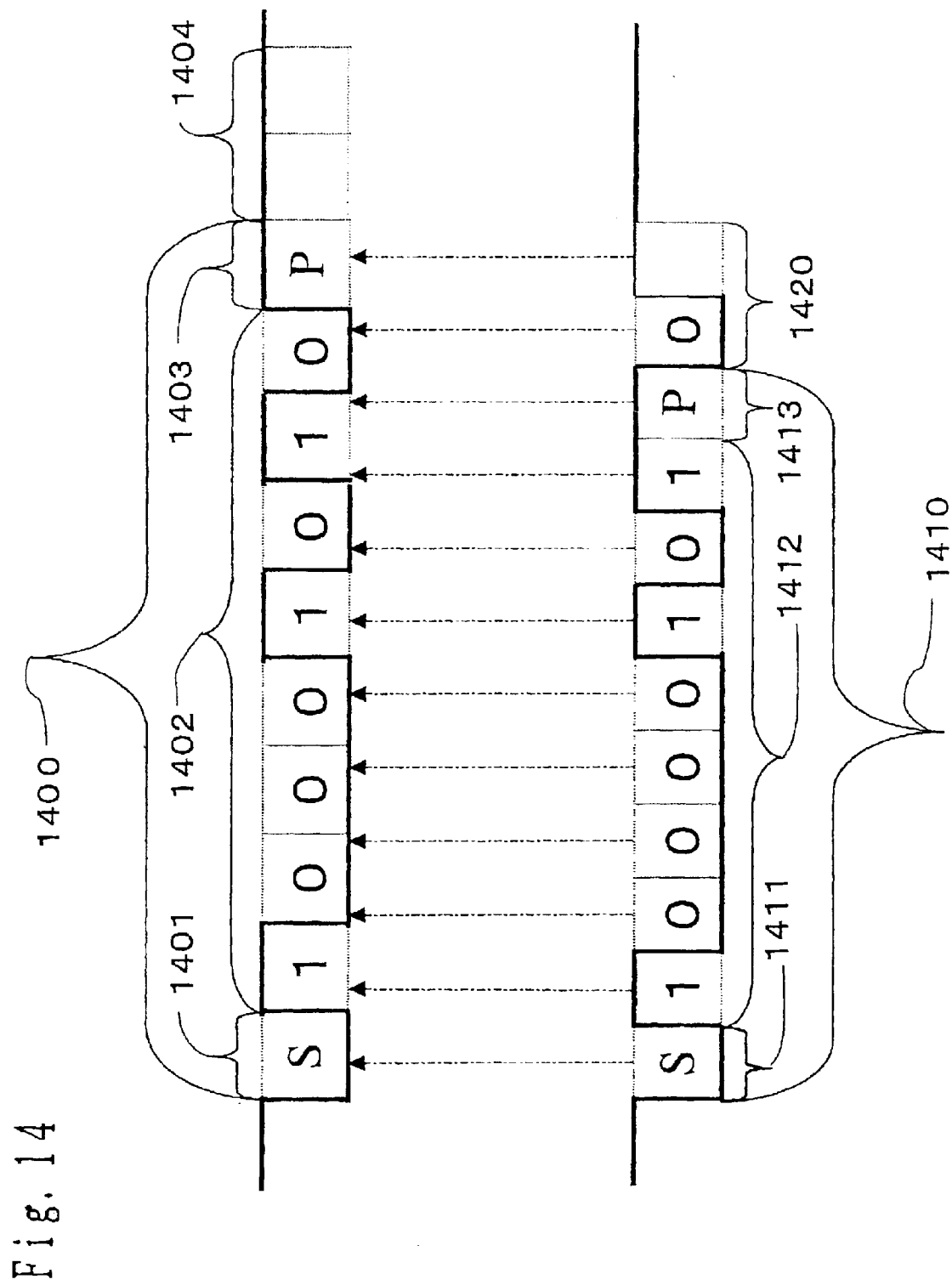
FIG. 14 is a view illustrating received data of one character and signal levels in a character protection period in the processing of the IC card reader/writer in accordance with Embodiment 1 of the present invention.

Furthermore, FIG. 14 is a view illustrating received data of one character and signal levels in a character protection period in the IC card reader/writer in accordance with this embodiment.

The operation of the IC card reader/writer in accordance with Embodiment 1 of the present invention configured as described above will be described referring to the drawings.

First, data transmitted serially from the IC card 109 is received by the serial/parallel conversion section 302 in character units. At this time, as shown in FIG. 14, because of the difference between transmission rates, data 1400 on the transmission side results in differing from data 1410 on the reception side at the main data portions, that is, the 8-bit data portions: 8-bit data 1402 on the side of transmitted data and 8-bit data 1412 on the side of received data.

Next, the frame check section 401 checks the signal level in the character protection period immediately after the received data of one character, in other words, checks the signal level of the 2-bit portion 1420 behind the parity bit 1413 of the received data 1410. When a Low signal level is not detected in the character protection period, the received data is transmitted to the parity check section 303.

On the other hand, when a Low signal level is detected in the character protection period, the following is performed. On the transmission side, the character protection period provided between data of one character and data is 1 etu (elementary time unit) at the minimum and 2 etu at the maximum, just like a character protection period 1404 immediately after the data 1400 on the transmission side shown in FIG. 14, and the signal level in this period is High; however, the signal level in the character protection period 1420 immediately after the received data 1410 is Low entirely or partly because of the difference between transmission rates. The frame check section 401 detects this Low signal level and discards the data.

When the Low level is detected, the result of the detection is notified to the retransmission request signal generation section 105, and the retransmission request signal generation section 105 transmits a retransmission request signal to the IC card 109. After receiving input from the frame check section 401, on the basis of this, the retransmission request signal generation section 105 outputs to the IC card 109 a retransmission request signal for allowing the data having the same character as that of the data received once to be transmitted from the IC card 109. After receiving the retransmission request signal, the IC card 109 retransmits the data having the same character as that of the data transmitted last.

Next, in the frame check section 401, the operation after it is detected that the signal level in the character protection period is High is performed in a manner similar to that in the conventional example. In other words, the parity check section 303 performs a check as to whether the parity calculated from the 8-bit received data coincides with the received parity. When there is no coincidence between the parity values, this is notified to the retransmission request signal generation section 105, and the retransmission request signal generation section 105 transmits a retransmission request signal to the IC card 109. When there is a coincidence between the parity values, the received data is stored in the reception buffer 304.

As described above, in the IC card reader/writer 150 in accordance with this embodiment, when the frame check section 401 checks the character protection period of the data and confirms that the signal level in the period is Low, the data received once is retransmitted from the IC card 109 by using the retransmission request signal generation section 105, whereby necessary data can be received again even when an error occurs in transmission rates.

EMBODIMENT 2

Figure 7:
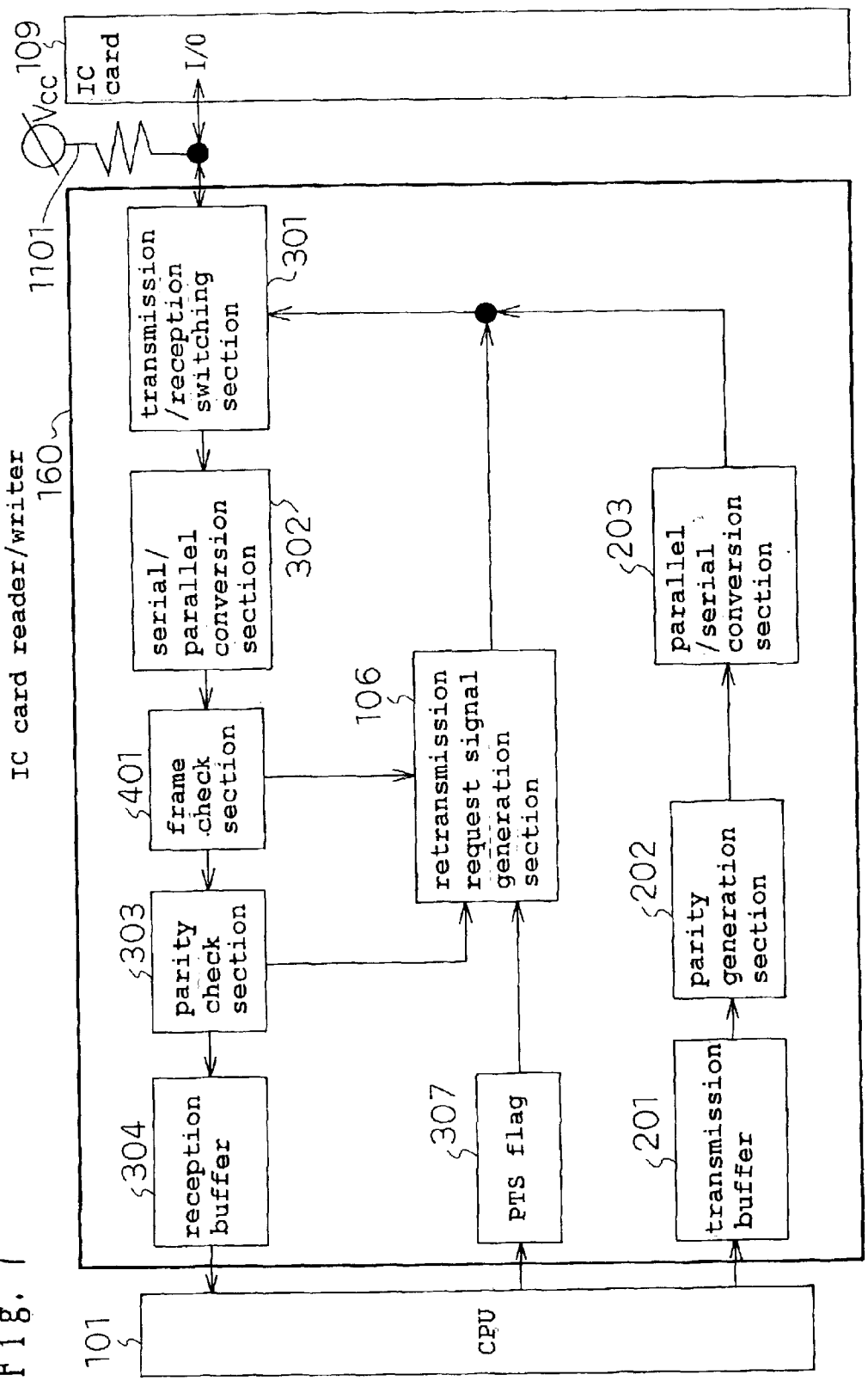
FIG. 7 is a system diagram of an IC card reader/writer in accordance with Embodiment 2 of the present invention.

FIG. 7 is a system diagram of an IC card reader/writer in accordance with Embodiment 2 of the present invention. The IC card reader/writer in accordance with this embodiment has a function of making a retransmission request to the IC card 109 when receiving data transmitted from the IC card 109, when a Low signal level is detected while the character of the received data is protected and only when a transmission protocol is T=0, and receiving the same data again.

In FIG. 7, numeral 160 designates an IC card reader/writer, numeral 101 designates a CPU, and numeral 109 designates an IC card. Furthermore, in the IC card reader/writer 160, numeral 101 designates a CPU, and numeral 201 designates a transmission buffer that temporarily stores transmitted data. Numeral 202 designates a parity generation section that generates a parity bit from the transmitted data. Numeral 203 designates a parallel/serial conversion section that serially transmits a start bit, 8-bit transmitted data and a parity bit. Numeral 106 designates a retransmission request signal generation section that issues a retransmission request signal to the IC card 109 and is used as a retransmission request means of the present invention. Numeral 301 designates a transmission/reception switching section that switches between data transmission to the IC card 109 and data reception from the IC card 109. Numeral 302 designates a serial/parallel conversion section that receives data transmitted serially from the IC card 109. Numeral 401 designates a frame check section that checks the signal level in the character protection period and is used as a signal level checking means of the present invention. Numeral 303 designates a parity check section that compares the received parity bit with the parity calculated from the received data. Numeral 304 designates a reception buffer that temporarily stores the received data. Furthermore, numeral 1101 designates a pull-up resistor that switches the signal level of a data terminal (not shown) to High or Low.

The operation of the IC card reader/writer configured as described above will be described referring to the drawings. However, the details of components overlapping with those of Embodiment 1 are omitted, and only the differences therebetween will be described.

First, before data reception, the CPU 101 identifies the transmission protocol for the IC card 109 through PTS exchange with the IC card 109 stipulated by IEC/ISO7816, and sets the PTS flag 307 when the transmission protocol is T=0.

Next, data transmitted serially in character units from the IC card 109 is received by the serial/parallel conversion section 302 in character units. Then, the frame check section 401 checks the signal level of data of one character in the character protection period.

When a Low signal level is not detected in the character protection period, the received data is transmitted to the parity check section 303. When a Low signal level is detected in the character protection period, this is notified to the retransmission request signal generation section 106, and the retransmission request signal generation section 106 transmits a retransmission request signal to the IC card 109 when the PTS flag 307 has been set.

The parity check section 303 performs a check as to whether the parity calculated from the 8-bit received data coincides with the received parity. When there is no coincidence between the parity values, this is notified to the retransmission request signal generation section 106, and the retransmission request signal generation section 106 transmits a retransmission request signal to the IC card 109 when the PTS flag 307 has been set. When there is a coincidence between the parity values, the received data is stored in the reception buffer 304.

As described above, in accordance with this embodiment, in addition to the configuration of Embodiment 1, the retransmission request signal generation section 106 is allowed to make a retransmission referring to the PTS flag 307, whereby the present invention is applicable to the IC card conforming to the IEC/ISO7816 Standard.

EMBODIMENT 3

Figure 8:
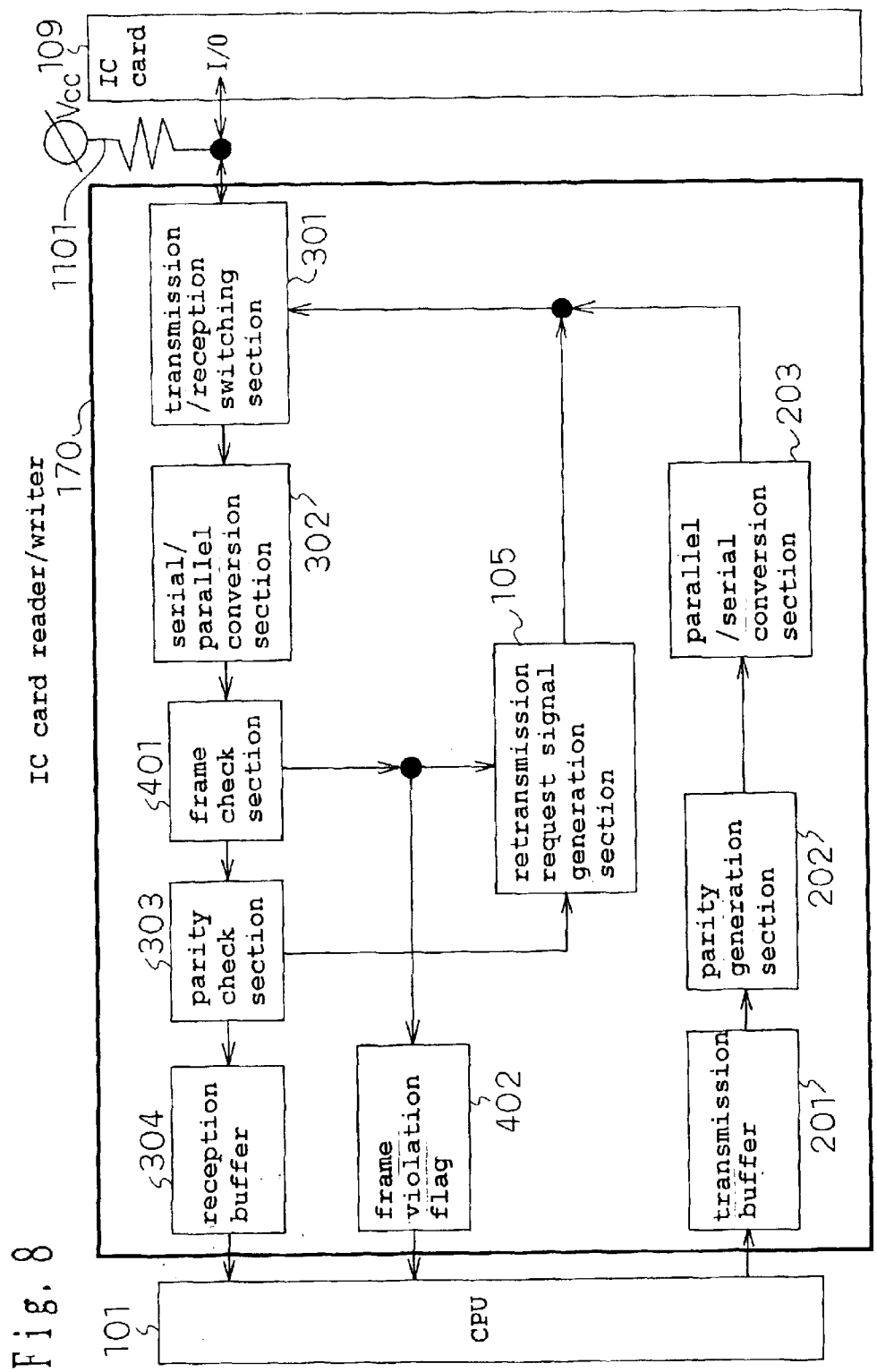
FIG. 8 is a system diagram of an IC card reader/writer in accordance with Embodiment 3 of the present invention.

FIG. 8 is a system diagram of an IC card reader/writer in accordance with Embodiment 3 of the present invention. The IC card reader/writer in accordance with this embodiment has a function of making a retransmission request to the IC card 109 when receiving data transmitted from the IC card 109 and when a Low signal level is detected while the character of the received data is protected, receiving the same data again, and notifying frame error detection.

In FIG. 8, numeral 170 designates an IC card reader/writer, numeral 101 designates a CPU, and numeral 109 designates an IC card. Furthermore, in the IC card reader/writer 170, numeral 201 designates a transmission buffer that temporarily stores transmitted data. Numeral 202 designates a parity generation section that generates a parity bit from the transmitted data. Numeral 203 designates a parallel/serial conversion section that serially transmits a start bit, 8-bit transmitted data and a parity bit. Numeral 105 designates a retransmission request signal generation section that issues a retransmission request signal to the IC card 109 and is used as a retransmission request means of the present invention. Numeral 301 designates a transmission/reception switching section that switches between data transmission to the IC card 109 and data reception from the IC card 109. Numeral 302 designates a serial/parallel conversion section that receives data transmitted serially from the IC card 109 and is used as a receiving means of the present invention. Numeral 401 designates a frame check section that checks the signal level in the character protection period and is used as a signal level detection means of the present invention. Numeral 303 designates a parity check section that compares the received parity bit with the parity calculated from the received data. Numeral 304 designates a reception buffer that temporarily stores the received data. Numeral 402 designates a frame violation flag indicating frame error detection. Furthermore, numeral 1101 designates a pull-up resistor that switches the signal level of a data terminal (not shown) to High or Low.

The operation of the IC card reader/writer in accordance with this embodiment configured as described above will be described referring to the drawings. However, the details of components overlapping with those of Embodiment 1 are omitted, and only the differences therebetween will be described.

First, data transmitted serially from the IC card 109 is received by the serial/parallel conversion section 302. Then, the frame check section 401 checks the signal level in the character protection period.

When a Low signal level is not detected in the character protection period, the received data is transmitted to the parity check section 303. The parity check section 303 performs a check as to whether the parity calculated from the 8-bit received data coincides with the received parity. When there is no coincidence between the parity values, this is notified to the retransmission request signal generation section 105, and the retransmission request signal generation section 105 transmits a retransmission request signal to the IC card 109. When there is a coincidence between the parity values, the received data is stored in the reception buffer 304.

On the other hand, when a Low signal level is detected in the character protection period, this is notified to the retransmission request signal generation section 105, and a retransmission request signal is transmitted to the IC card 109.

The above-mentioned operation is similar to the operation in Embodiment 1; however, in this embodiment, when the frame check section 401 detects a Low signal level, the frame violation flag 402 is set. The state of the frame violation flag 402 is checked by the CPU 101, whereby the CPU 101 can recognize that a frame violation has occurred during data reception from the IC card.

EMBODIMENT 4

Figure 9:
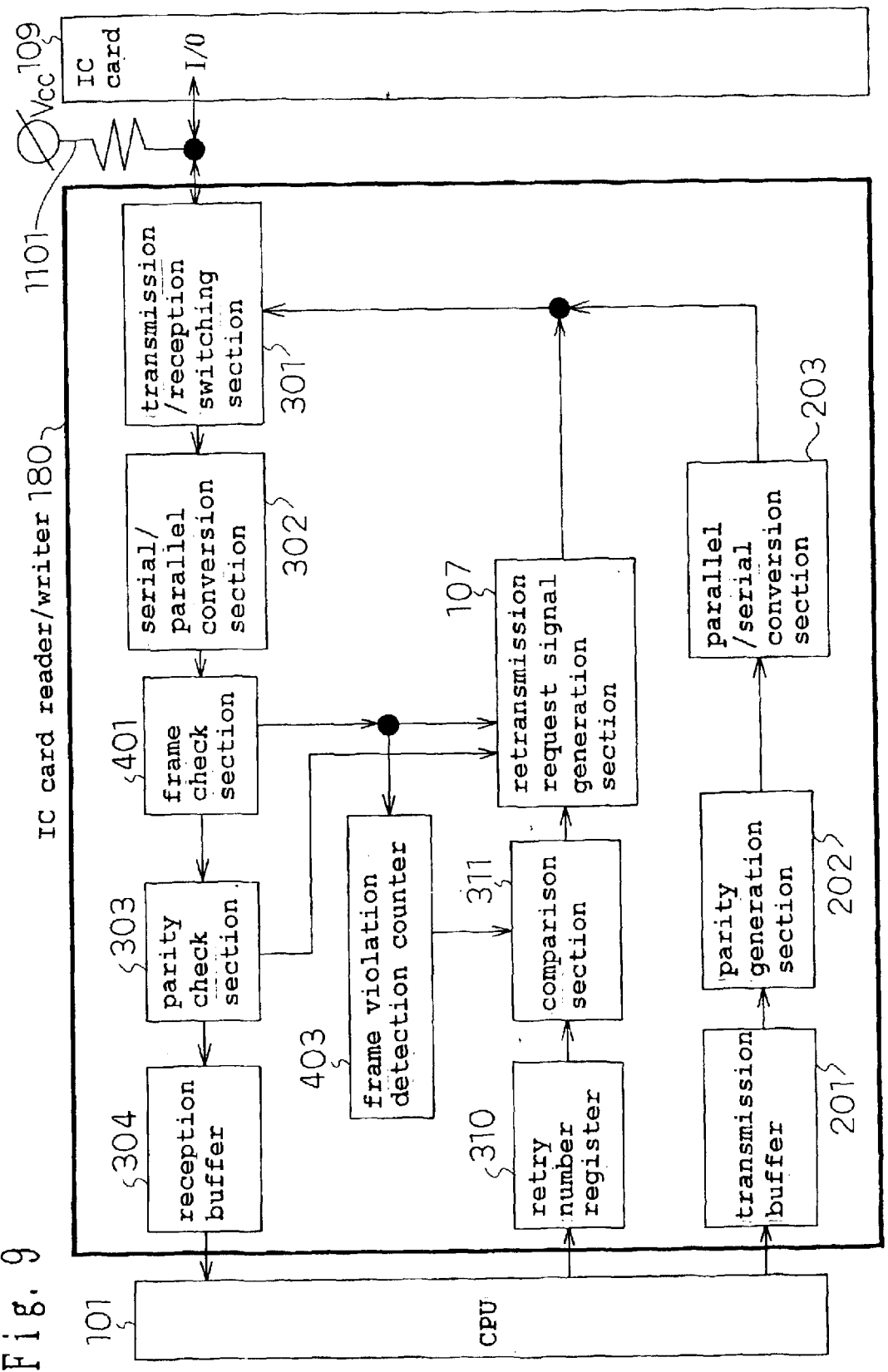
FIG. 9 is a system diagram of an IC card reader/writer in accordance with Embodiment 4 of the present invention.

FIG. 9 is a system diagram of an IC card reader/writer in accordance with Embodiment 4 of the present invention. The IC card reader/writer in accordance with this embodiment has a function of transmitting a retransmission request signal to the IC card 109 when receiving data transmitted from the IC card 109 and when a Low signal level is detected while the character of the received data is protected, and not transmitting a retransmission request signal when the number of continuous retransmission requests has reached a predetermined value in the reception of the same data.

In FIG. 9, numeral 180 designates an IC card reader/writer, numeral 101 designates a CPU, and numeral 109 designates an IC card. Furthermore, in the IC card reader/writer 180, numeral 101 designates a CPU, and numeral 201 designates a transmission buffer that temporarily stores transmitted data. Numeral 202 designates a parity generation section that generates a parity bit from the transmitted data. Numeral 203 designates a parallel/serial conversion section that serially transmits a start bit, 8-bit transmitted data and a parity bit. Numeral 107 designates a retransmission request signal generation section that issues a retransmission request signal to the IC card 109 and is used as a retransmission request means of the present invention. Numeral 301 designates a transmission/reception switching section that switches between data transmission to the IC card 109 and data reception from the IC card 109. Numeral 302 designates a serial/parallel conversion section that receives data transmitted serially from the IC card 109. Numeral 401 designates a frame check section that checks the signal level in the character protection period and is used as a signal level checking means of the present invention. Numeral 303 designates a parity check section that compares the received parity bit with the parity calculated from the received data. Numeral 304 designates a reception buffer that temporarily stores the received data. Numeral 403 designates a frame violation detection counter that counts the number of continuous retransmission requests in the reception of the same data. Numeral 310 designates a retry number register that determines the upper limit of the number of continuous retransmission requests in the reception of the same data and is used as a retransmission request number register of the present invention. Numeral 311 designates a comparison section that compares the value of the frame violation detection counter 309 with the value of the retry number register 310. Furthermore, numeral 1101 designates a pull-up resistor that switches the signal level of a data terminal (not shown) to High or Low.

The operation of the IC card reader/writer configured as described above will be described referring to the drawings. However, the details of components overlapping with those of Embodiment 1 are omitted, and only the differences therebetween will be described.

First, the CPU 101 sets in the retry number register 310 the upper limit of the number of continuous retransmission requests in the reception of the same data transmitted from the IC card 109.

Next, data transmitted from the IC card 109 is received by the serial/parallel conversion section 302. Then, the frame check section 401 checks the signal level in the character protection period. When a Low signal level is not detected in the character protection period, the received data is transmitted to the parity check section 303. When a Low signal level is detected in the character protection period, this is notified to the retransmission request signal generation section 107, and a retransmission request signal is transmitted to the IC card 109.

The above-mentioned operation is similar to the operation in Embodiment 1; however, in this embodiment, when the frame check section 401 detects a frame error in one data reception operation, 1 is added to the value of the frame violation detection counter 403; when the frame check section 401 does not detect a frame error, the value of the frame violation detection counter 403 is reset.

The comparison section 311 compares the value of the frame violation detection counter 403 with the value of the retry number register 310; when the value of the frame violation detection counter 403 has reached the value of the retry number register 310, a notification is given to retransmission request signal generation section 104 so as not to request retransmission even if the frame check section 401 detects a frame error.

EMBODIMENT 5

Figure 10:
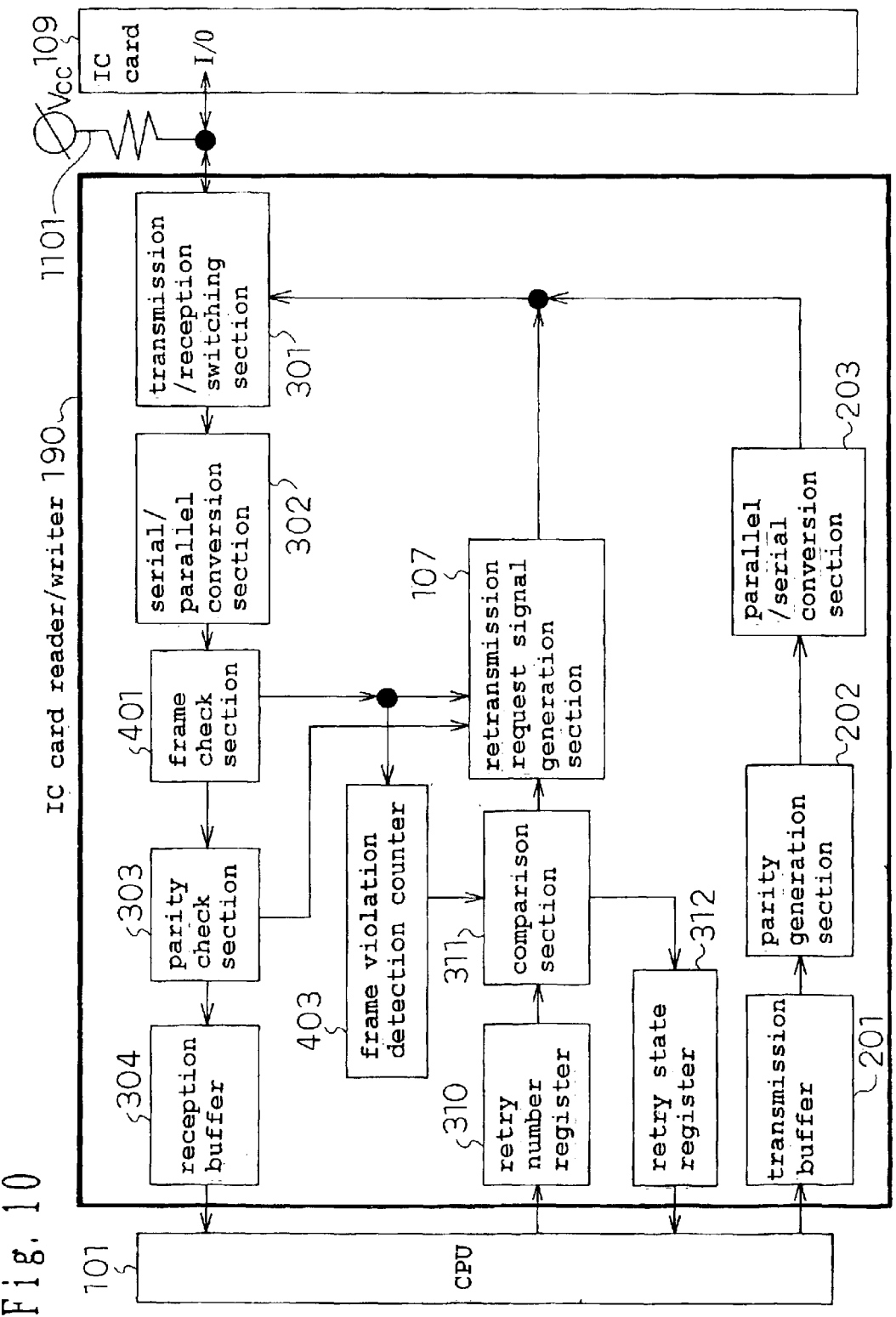
FIG. 10 is a system diagram of an IC card reader/writer in accordance with Embodiment 5 of the present invention.
Figure 11:
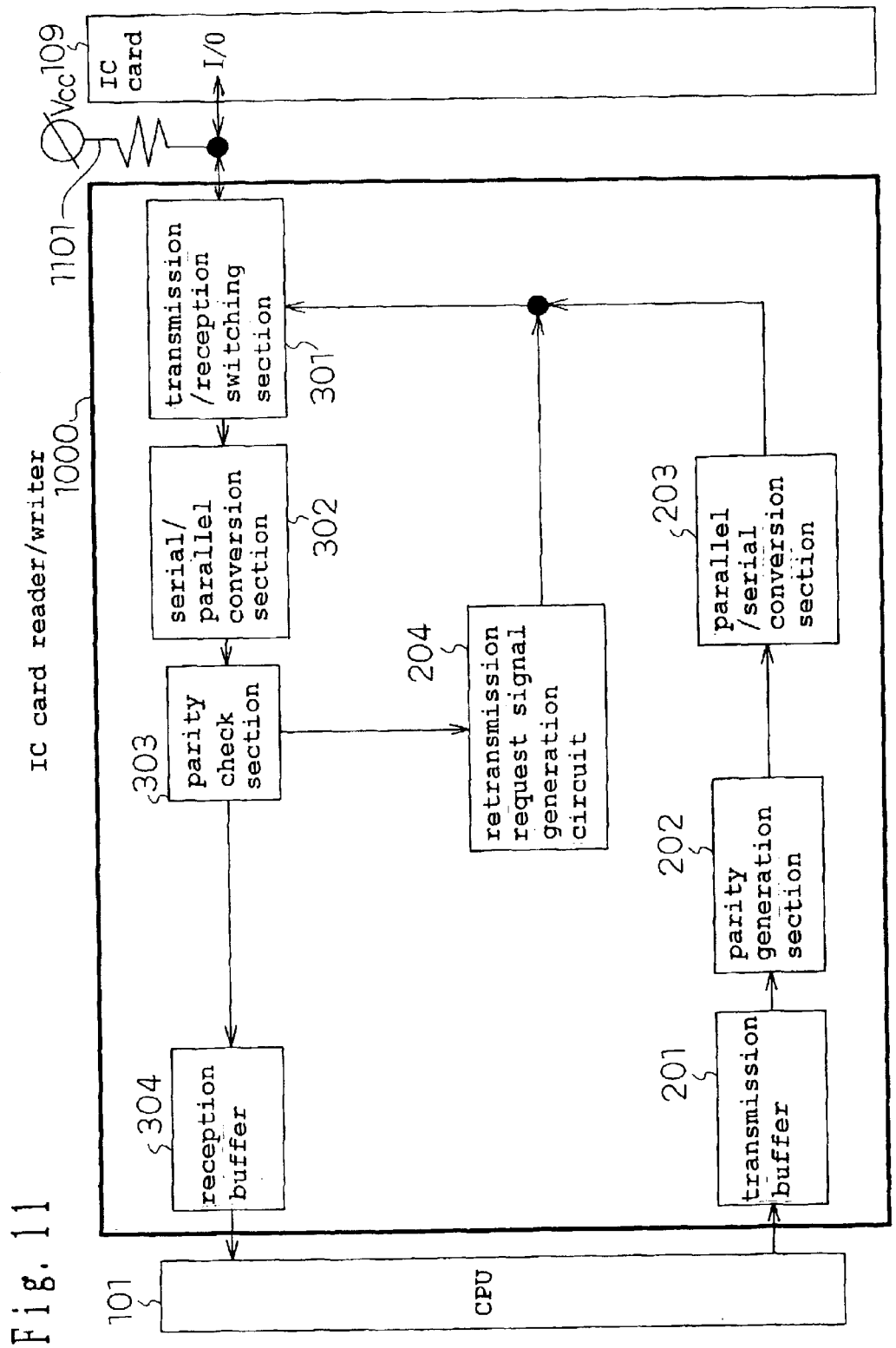
FIG. 11 is a system diagram of the conventional IC card reader/writer.
Figure 13:
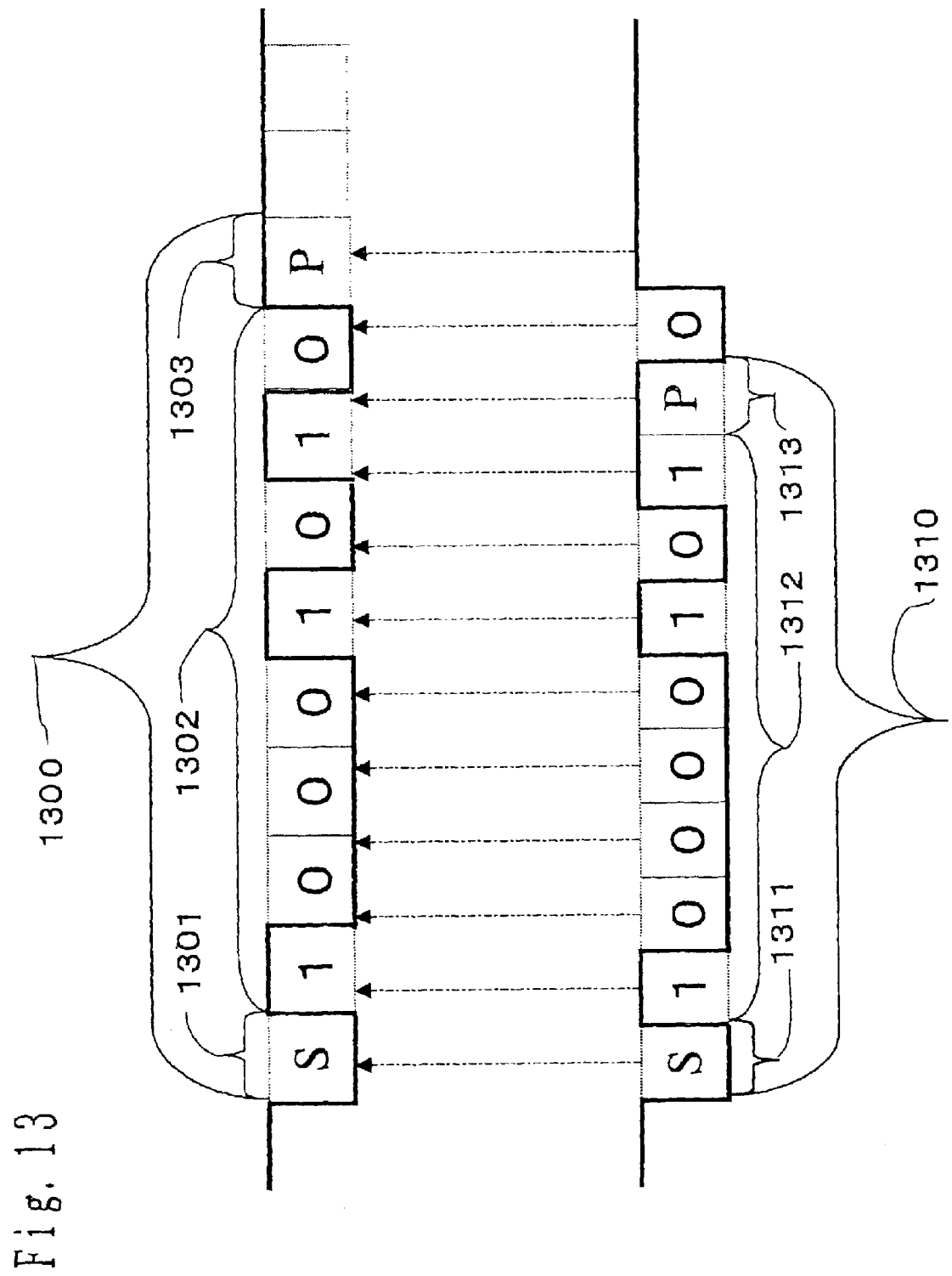
FIG. 13 is a timing chart showing a transmission example not causing a parity error.

FIG. 10 is a system diagram of an IC card reader/writer in accordance with Embodiment 5 of the resent invention. The IC card reader/writer in accordance with this embodiment has a function of transmitting a retransmission request signal to the IC card 109 when receiving data transmitted from the IC card 109 and when a Low signal level is detected while the character of the received data is protected, not transmitting a retransmission request signal when the number of continuous retransmission requests has reached a predetermined value in the reception of the same data, and giving a notification that the number of continuous retransmission requests in the reception of the same data has reached the predetermined value.

In FIG. 10, numeral 190 designates an IC card reader/writer, numeral 101 designates a CPU, and numeral 109 designates an IC card. Furthermore, in the IC card reader/writer 130, numeral 201 designates a transmission buffer that temporarily stores transmitted data. Numeral 202 designates a parity generation section that generates a parity bit from the transmitted data. Numeral 203 designates a parallel/serial conversion section that serially transmits a start bit, 8-bit transmitted data and a parity bit. Numeral 107 designates a retransmission request signal generation section that issues a retransmission request signal to the IC card 109 and is used as a retransmission request means of the present invention. Numeral 301 designates a transmission/reception switching section that switches between data transmission to the IC card 109 and data reception from the IC card 109. Numeral 302 designates a serial/parallel conversion section that receives data transmitted serially from the IC card 109 and is used as a receiving means of the present invention. Numeral 401 designates a frame check section that checks the signal level in the character protection period and is used as a signal level checking means of the present invention. Numeral 303 designates a parity check section that compares the received parity bit with the parity calculated from the received data. Numeral 304 designates a reception buffer that temporarily stores the received data. Numeral 403 designates a frame violation detection counter that counts the number of continuous retransmission requests in the reception of the same data. Numeral 310 designates a retry number register that determines the upper limit of the number of continuous retransmission requests in the reception of the same data. Numeral 311 designates a comparison section that compares the value of the frame violation detection counter 403 with the value of the retry number register 310. Numeral 312 designates a retry state register that indicates that the number of continuous retransmission requests in the reception of the same data has reached the value having been set in the retry number register 310 and is used as a retransmission request state register of the present invention. Furthermore, numeral 1101 designates a pull-up resistor that switches the signal level of a data terminal (not shown) to High or Low.

The operation of the IC card reader/writer in accordance with this embodiment configured as described above will be described referring to the drawings. However, the details of components overlapping with those of Reference Example 5 or Embodiment 4 are omitted, and only the differences therebetween will be described.

The operation of the IC card reader/writer configured as described above will be described referring to the drawings.

First, the CPU 101 sets in the retry number register 310 the upper limit of the number of continuous retransmission requests in the reception of the same data transmitted from the IC card 109.

Next, data transmitted from the IC card 109 is received by the serial/parallel conversion section 302. Then, the frame check section 401 checks the signal level in the character protection period. When a Low signal level is not detected in the character protection period, the received data is transmitted to the parity check section 303. When a Low signal level is detected in the character protection period, this is notified to the retransmission request signal generation section 107, and a retransmission request signal is transmitted to the IC card 109. The frame violation detection counter 403 is reset when data is received and when no frame error is detected by the frame check section 401; when a frame error is detected, 1 is added to the value of the counter. The comparison section 311 compares the value of the frame violation detection counter 403 with the value of the retry number register 310; when the value of the frame violation detection counter 403 has reached the value of the retry number register 310, a notification is given to the retransmission request signal generation section 107 so as not to request retransmission even if a frame error is detected.

The above-mentioned operation is similar to the operation in Embodiment 4; however, in this embodiment, when the value of the frame violation detection counter 403 has reached the value of the retry number register 310 in one data reception operation in accordance with the comparison by the comparison section 11, the retry state register 312 is set. Hence, the CPU 101 can recognize the number of retransmission requests on the basis of a frame error during data reception from the IC card.

Although the unit of data to be processed once by the IC card reader/writer is one character in each of the above-mentioned embodiments, this is an example, and data may be processed in desired processing units; furthermore, the 8-bit data portion in accordance with the embodiments is an example, and the size of the data portion may be larger or smaller than 8 bits. Moreover, the object to be checked by the signal level checking means of the present invention may have a character protection period larger or smaller than 2 etu indicated in the embodiments. Briefly speaking, the signal level checking means of the present invention may check the signal size at a given point in a predetermined period after a reception period in which data comprising a main data portion, a start bit and a parity bit is received.

Furthermore, in the above-mentioned explanations, the IC card reader/writers in accordance with the embodiments of the present invention are explained; however, the present invention may be realized by a medium that holds programs and/or data for carrying out all or parts of the functions of all or parts of the means of the above-mentioned present invention by using a computer and can be read by the computer, wherein the above-mentioned programs and/or data having been read carry out the above-mentioned functions in cooperation with the above-mentioned computer.

Still further, the present invention may be realized by an information collection comprising programs and/or data for carrying out all or parts of the functions of all or parts of the means of the above-mentioned present invention by using a computer, wherein the above-mentioned functions are carried out in cooperation with the above-mentioned computer.

Still further, in the above-mentioned description, the data includes data structures, data formats, data types, etc. Still further, the medium includes recording media, such as ROM, transmission media, such as the Internet, and transmission media, such as light, radio wave and sound wave. Still further, the data holding medium includes recording media for recording programs and/or data and transmission media for transmitting programs and/or data, for example.

Still further, in the case of a recording medium, such as ROM, for example, processable by computer means that the medium can be read by computer; in the case of a transmission medium, processable by computer means that programs and/or data to be transmitted can be handled by computer as the result of transmission; and an information collection includes software, such as programs and/or data.

Hence, as described above, the configuration of the present invention may be realized by software or realized by hardware.

As described above, in accordance with the present invention, frame errors and reception overruns that cannot be detected by conventional IC card reader/writers are detected, retransmission is requested by using the function of making a retransmission request at the time when a parity error is detected, and the same data is received again, whereby data transmitted from an IC card can be received securely.

Industrial Applicability

As clarified from the above descriptions, the present invention can securely receive data even when the capacity of the reception buffer is small and can improve the detection rate of transmission errors due to the influence of noise or the like, thereby having an advantage of being able to realize more secure data transmission.

What is claimed is:

1. An IC card reader/writer comprising:
   receiving means that receives a signal transmitted from an IC card and includes data in predetermined processing units to be transmitted with a protection period held there between,
   signal level checking means that, in the case when said receiving means receives said data in said predetermined processing units, checks the level of said signal in a predetermined period after a predetermined reception period for receiving said data,
   retransmission request means that discards said data in said predetermined processing units and requests said IC card to retransmit data having the same content as that of said discarded data when said signal level checking means detects a predetermined level at least in the whole or parts of said signal in said predetermined period, and
   a Protocol Type Selection (PTS) flag identifying a transmission protocol for said IC card that is set by the receiving means only when said IC card can retransmit said data in character units, wherein
   said retransmission request means requests said IC card to retransmit said received data when said signal level checking means has detected said predetermined signal level in said predetermined period and said PTS flag has been set.

2. The IC card reader/writer in accordance with claim 1, wherein said signal level checking means detects the level of said signal of the minimum unit in said predetermined period immediately after said reception period.

3. The IC card reader/writer in accordance with claim 1 or 2, further comprising a frame violation flag that is set when said signal level checking means detects said predetermined signal level in said predetermined period.

4. The IC card reader/writer in accordance with claim 1 or 2, further comprising:
 a frame violation detection counter that counts the number of times said predetermined signal is detected in said predetermined period by said signal level checking means,
 a retransmission request number register that determines the maximum of the number of times said predetermined signal is detected, and
 comparing means that compares the number of times counted by said frame violation detection counter with the value of said retransmission request number register, wherein
 when the number of times said predetermined signal is detected in said predetermined period has reached a predetermined number of said retransmission request number register as the result of the comparison by said comparing means, said retransmission request means does not request retransmission of data having the same character as that of said received data.

5. The IC card reader/writer in accordance with claim 4, further comprising a retransmission request state register that notifies that the number of times said predetermined signal level is detected in said predetermined period has reached the number determined in said retransmission request number register.

* * * * *

UNITED STATES PATENT AND TRADEMARK OFFICE
CERTIFICATE OF CORRECTION

PATENT NO.    : 6,779,724 B1
DATED         : August 24, 2004
INVENTOR(S)   : Yamada It is certified that error appears in the above-identified patent and that said Letters Patent is hereby corrected as shown below:

<u>Tilte page,</u>
Item [56], References Cited, FOREIGN PATENT DOCUMENTS,
"JP 63-126083  5/1998" should read -- JP 63-126083  5/1988 --.

OTHER PUBLICATIONS, "to applicantion" should read -- to application --.

Signed and Sealed this

Nineteenth Day of April, 2005

JON W. DUDAS
*Director of the United States Patent and Trademark Office*